(12) United States Patent
Kumakura et al.

(10) Patent No.: US 12,422,175 B2
(45) Date of Patent: Sep. 23, 2025

(54) REFRIGERANT CYCLE SYSTEM

(71) Applicant: DAIKIN INDUSTRIES, LTD., Osaka (JP)

(72) Inventors: Eiji Kumakura, Osaka (JP); Takuro Yamada, Osaka (JP); Atsushi Yoshimi, Osaka (JP); Ikuhiro Iwata, Osaka (JP); Tomoatsu Minamida, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 424 days.

(21) Appl. No.: 17/618,261

(22) PCT Filed: Jun. 11, 2020

(86) PCT No.: PCT/JP2020/023068
§ 371 (c)(1),
(2) Date: Dec. 10, 2021

(87) PCT Pub. No.: WO2020/250986
PCT Pub. Date: Dec. 17, 2020

(65) Prior Publication Data
US 2022/0228782 A1   Jul. 21, 2022

(30) Foreign Application Priority Data

Jun. 12, 2019  (JP) ................. 2019-109414
Jun. 12, 2019  (JP) ................. 2019-109415

(51) Int. Cl.
*F25B 40/06* (2006.01)
*F25B 5/04* (2006.01)
(Continued)

(52) U.S. Cl.
CPC ............. *F25B 40/06* (2013.01); *F25B 5/04* (2013.01); *F25B 7/00* (2013.01); *F25B 49/02* (2013.01);
(Continued)

(58) Field of Classification Search
CPC .... F25B 40/06; F25B 5/04; F25B 7/00; F25B 49/02; F25B 2309/06; F25B 400/0419
See application file for complete search history.

(56) References Cited

U.S. PATENT DOCUMENTS 6,237,358 B1    5/2001  Kondo et al.
6,405,554 B1 *  6/2002  Kawakatu ............... F25B 7/00
                                                      62/175
(Continued)

FOREIGN PATENT DOCUMENTS

CN    103105024 A    5/2013
CN    103673123 A    3/2014
(Continued)

OTHER PUBLICATIONS

WO-2015071967-A1 Translation (Year: 2015).*
(Continued)

*Primary Examiner* — David J Teitelbaum
(74) *Attorney, Agent, or Firm* — Birch, Stewart, Kolasch & Birch, LLP

(57) ABSTRACT

Refrigerant is caused to be in a superheating state without impairing the performance of a cascade heat exchanger. A refrigerant cycle system includes a first refrigerant circuit, a second refrigerant circuit, and a first cascade heat exchanger. The first cascade heat exchanger exchanges heat between a first refrigerant that flows in the first refrigerant circuit and a second refrigerant that flows in the second refrigerant circuit. The refrigerant cycle system includes a switching mechanism. The switching mechanism switches a flow path of a refrigerant of at least either one of the first refrigerant circuit and the second refrigerant circuit. The first cascade heat exchanger includes a first main heat exchanging unit acid a first sub heat exchanging unit. The first sub heat exchanging unit is configured to cause the first refrigerant (Continued)

that has passed through the first main heat exchanging unit to be in a superheating state.

18 Claims, 4 Drawing Sheets

(51) Int. Cl.
    *F25B 7/00*     (2006.01)
    *F25B 49/02*     (2006.01)

(52) U.S. Cl.
    CPC ... *F25B 2309/06* (2013.01); *F25B 2400/0419* (2013.01)

(56) References Cited

U.S. PATENT DOCUMENTS

| | | | |
|---|---|---|---|
| 10,001,310 B2 | 6/2018 | Takayama et al. | |
| 10,612,821 B1* | 4/2020 | Fernando | F25B 1/10 |
| 2005/0268620 A1* | 12/2005 | Sami | F28F 13/16 |
| | | | 62/3.1 |
| 2007/0271936 A1* | 11/2007 | Wakamoto | F25B 7/00 |
| | | | 62/160 |
| 2010/0018246 A1* | 1/2010 | Wolfe, IV | F28D 7/022 |
| | | | 165/154 |
| 2010/0043475 A1* | 2/2010 | Taras | F28F 9/0234 |
| | | | 62/331 |
| 2013/0180278 A1 | 7/2013 | Yamashita et al. | |
| 2014/0013786 A1* | 1/2014 | Kanamaru | F25B 7/00 |
| | | | 62/331 |
| 2014/0083122 A1 | 3/2014 | Ha et al. | |
| 2014/0260404 A1* | 9/2014 | Verma | F25B 25/005 |
| | | | 62/333 |
| 2014/0290292 A1 | 10/2014 | Kato et al. | |
| 2015/0377541 A1* | 12/2015 | Yoshikawa | F25B 49/02 |
| | | | 62/140 |
| 2017/0108247 A1* | 4/2017 | Sata | F25B 43/00 |
| 2017/0248349 A1 | 8/2017 | Kujak et al. | |
| 2021/0333021 A1 | 10/2021 | Matsuoka et al. | |

FOREIGN PATENT DOCUMENTS

| | | | |
|---|---|---|---|
| EP | 2 420 760 A1 | 2/2012 | |
| EP | 2 594 867 A2 | 5/2013 | |
| JP | 3-271659 A | 12/1991 | |
| JP | 7-234027 A | 9/1995 | |
| JP | 7-243711 A | 9/1995 | |
| JP | 9-269155 A | 10/1997 | |
| JP | 2000-193339 A | 7/2000 | |
| JP | 2012-112622 A | 6/2012 | |
| JP | 2012-127606 A | 7/2012 | |
| JP | 2012-172800 A | 9/2012 | |
| JP | 2012-172890 A | 9/2012 | |
| JP | 2012-184873 A | 9/2012 | |
| JP | 2012-220111 A | 11/2012 | |
| JP | 2013-130357 A | 7/2013 | |
| JP | 2013-148330 A | 8/2013 | |
| JP | 5595245 B2 | 9/2014 | |
| JP | 2017-161182 A | 9/2017 | |
| WO | WO2012/066763 A1 | 5/2012 | |
| WO | WO-2015071967 A1 * | 5/2015 | F25B 40/02 |
| WO | WO 2018/235832 A1 | 12/2018 | |

OTHER PUBLICATIONS

International Search Report (PCT/ISA/210) issued in PCT/JP2020/023068 mailed on Aug. 11, 2020.
Written Opinion (PCT/ISA/237) issued in PCT/JP2020/023068 mailed on Aug. 11, 2020.
Extended European Search Report for Application No. EP 20821885.9 dated Jun. 24, 2022.
English Translation of the International Preliminary Report on Patentability and Written Opinion of the International Searching Authority for International Application No. PCT/JP2020/023068, dated Dec. 23, 2021.

* cited by examiner

REFRIGERANT CYCLE SYSTEM

TECHNICAL FIELD

The present disclosure relates to a refrigerant cycle system.

BACKGROUND ART

As described in PTL 1 (Japanese Unexamined Patent Application Publication No. 2000-193339), a dual refrigerant circuit configured by a vapor compression refrigeration cycle is known.

SUMMARY OF THE INVENTION

Technical Problem

Control of a state of refrigerant in the dual refrigerant circuit is not mentioned in PTL 1.

Solution to Problem

A refrigerant cycle system according to a first aspect includes a first refrigerant circuit, a second refrigerant circuit, and a first cascade heat exchanger. The first refrigerant circuit is a vapor compression refrigeration cycle. The second refrigerant circuit is a vapor compression refrigeration cycle. The first cascade heat exchanger exchanges heat between a first refrigerant that flows in the first refrigerant circuit and a second refrigerant that flows in the second refrigerant circuit. The refrigerant cycle system includes a switching mechanism. The switching mechanism switches a flow path of a refrigerant of at least either one of the first refrigerant circuit and the second refrigerant circuit. The first cascade heat exchanger includes a first main heat exchanging unit and a first sub heat exchanging unit. The first refrigerant that has passed through the first main heat exchanging unit passes through the first sub heat exchanging unit.

Consequently, it is possible to control the superheating state of the first refrigerant in the first sub heat exchanging unit. The superheating state of the first refrigerant is thus controlled easily.

A refrigerant cycle system according to a second aspect is the system according to the first aspect further including a first flow-rate regulating valve and a control unit. The first flow-rate regulating valve regulates the amount of the first refrigerant that flows in the first cascade heat exchanger in the first refrigerant circuit. The control unit regulates the opening degree of the first flow-rate regulating valve. When the first cascade heat exchanger of the first refrigerant circuit serves as an evaporator, the control unit regulates the opening degree of the first flow-rate regulating valve to cause the first refrigerant that exits the first sub heat exchanging unit to be in a superheating state.

A refrigerant cycle system according to the third aspect is the system according to the first aspect or the second aspect in which the first main heat exchanging unit is a plate heat exchanger or a heat exchanger that includes a plurality of stacked flat pipes. The first sub heat exchanging unit is a double pipe or a heat exchanging unit that has a structure in contact with a pipe.

Due to the sub heat exchanging unit 21*b* being the heat exchanger described above, it is possible to reduce an increase in costs caused by the provision of the sub heat exchanging unit 21*b*.

A refrigerant cycle system according to a fourth aspect is the system according to any one of the first aspect to the third aspect further including a third refrigerant circuit and a second cascade heat exchanger. The third refrigerant circuit is a vapor compression refrigeration cycle. The second cascade heat exchanger exchanges heat between the first refrigerant that flows in the first refrigerant circuit and a third refrigerant that flows in the third refrigerant circuit. The second cascade heat exchanger includes a second main heat exchanging unit and a second sub heat exchanging unit. The second sub heat exchanging unit is configured to cause refrigerant that has passed through the second main heat exchanging unit to be in a superheating state. The first cascade heat exchanger and the second cascade heat exchanger are connected in parallel in the first refrigerant circuit.

Consequently, the number of connectable usage-side heat exchangers is increased, which increases flexibility in construction of a refrigerant cycle system.

A refrigerant cycle system according to a fifth aspect is the system according to the first aspect in which the first sub heat exchanging unit exchanges heat in the first refrigerant circuit between the first refrigerant that has not entered the first main heat exchanging unit yet and the first refrigerant that has exited the first main heat exchanging unit.

Consequently, it is possible to control the degree of superheating of the first refrigerant.

A refrigerant cycle system according to a sixth aspect is the system according to the fifth aspect in which the first refrigerant circuit further includes a first bypass circuit. When the first main heat exchanging unit serves as a condenser in the first refrigerant circuit, the first refrigerant that has exited the first main heat exchanging unit bypasses the first sub heat exchanging unit via the first bypass circuit and is sucked by a compressor included in the first refrigerant circuit.

The provision of the first bypass circuit enables the first refrigerant to bypass the first sub heat exchanging unit when the first refrigerant circuit performs heating operation.

A refrigerant cycle system according to a seventh aspect is the system according to the fifth aspect or the sixth aspect further including a third refrigerant circuit and a second cascade heat exchanger. The third refrigerant circuit is a vapor compression refrigeration cycle. The second cascade heat exchanger exchanges heat between the first refrigerant and a third refrigerant that flows in the third refrigerant circuit. The second cascade heat exchanger includes a second main heat exchanging unit and a second sub heat exchanging unit. The first refrigerant that has passed through the second main heat exchanging unit passes through the second sub heat exchanging unit.

Consequently, it is possible to connect a larger number of usage-side units with respect to one heat-source-side unit.

A refrigerant cycle system according to an eighth aspect is the system according to the seventh aspect in which the first refrigerant circuit further includes a second bypass circuit. When the second main heat exchanging unit serves as a condenser in the first refrigerant circuit, the second refrigerant that has exited the second main heat exchanging unit bypasses the second sub heat exchanging unit (241*b*) via the second bypass circuit and is sucked by a compressor included in the first refrigerant circuit.

The provision of the second bypass circuit enables the first refrigerant to bypass the second sub heat exchanging unit when the first refrigerant circuit performs heating operation.

A refrigerant cycle system according to a ninth aspect is the system according to the seventh aspect or the eighth aspect in which the second main heat exchanging unit has heat exchanging capacity larger than heat exchanging capacity of the second sub heat exchanging unit.

A refrigerant cycle system according to a tenth aspect is the system according to any one of the first aspect to the ninth aspect in which the first main heat exchanging unit has heat exchanging capacity larger than heat exchanging capacity of the first sub heat exchanging unit.

A refrigerant cycle system according to an eleventh aspect is the system according to any one of the first aspect to the tenth aspect in which each of the first refrigerant and the second refrigerant is any one of HFC refrigerant, HFO refrigerant, and natural refrigerant. Alternatively, each of the first refrigerant and the second refrigerant is a mixture refrigerant that contains any two or more of HFC refrigerant, HFO refrigerant, natural refrigerant, and $CF_3I$.

A refrigerant cycle system according to a twelfth aspect is the system according to any one of the first aspect to the eleventh aspect in which each of the first refrigerant and the second refrigerant is R32.

Consequently, it is possible to divert an existing refrigerant cycle system.

A refrigerant cycle system according to a thirteenth aspect is the system according to any one of the first aspect to the twelfth aspect in which the first refrigerant is R32. The second refrigerant is carbon dioxide.

DESCRIPTION OF EMBODIMENTS

First Embodiment (1) Configuration of Air Conditioning Apparatus

Figure 1:
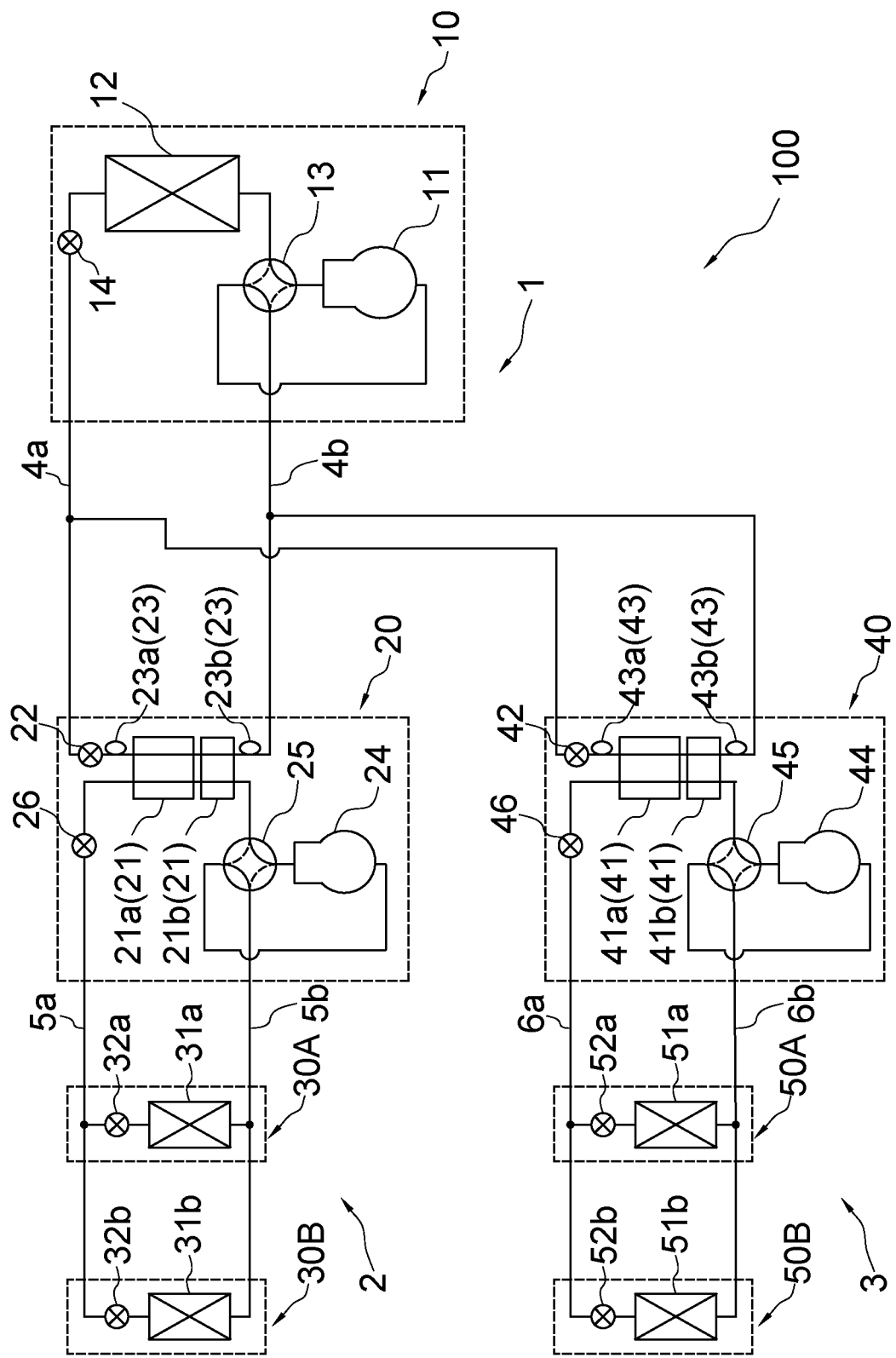
FIG. 1 is a view illustrating a refrigerant circuit of an air conditioning apparatus.

As illustrated in FIG. 1, an air conditioning apparatus 100 as one embodiment of a refrigerant cycle apparatus is an apparatus that cools and heats a room in a construction, such as a building, by a first refrigerant circuit 1, a second refrigerant circuit 2, and a third refrigerant circuit 3 that are vapor compression refrigeration cycles.

The air conditioning apparatus 100 mainly includes a heat-source-side unit 10 that belongs to the first refrigerant circuit 1, a plurality of usage-side units 30A and 30B (two in the present embodiment) that belong to the second refrigerant circuit 2, a plurality of usage-side units 50A and 50B (two in the present embodiment) that belong to the third refrigerant circuit, a first cascade unit 20 that is disposed between the heat-source-side unit 10 and the usage-side units 30A and 30B, a second cascade unit 40 that is disposed between the heat-source-side unit 10 and the usage-side units 50A and 50B, refrigerant connection pipes 4a, 4b, 5a, 5b, 6a, and 6b, and a control unit 60.

The first cascade unit 20 and the second cascade unit 40 are connected in parallel to each other in the first refrigerant circuit 1. The plurality of usage-side units 30A and 30B are connected in parallel to each other in the second refrigerant circuit 2. The plurality of usage-side units 50A and 50B are connected in parallel to each other in the third refrigerant circuit 3.

The control unit 60 is connected to a control unit of each unit via a transmission line and the like. The control unit 60 controls each constituent device included in the air conditioning apparatus 100 and controls the entirety of the air conditioning apparatus 100.

R32 is charged as a first refrigerant, a second refrigerant, and a third refrigerant in the first refrigerant circuit 1, the second refrigerant circuit 2, and the third refrigerant circuit 3, respectively.

(2) Detailed Configuration of Each Unit (2-1) Usage-Side Unit

The usage-side units 30A, 30B, 50A, and 50B are installed inside a room of a building or the like.

The plurality of usage-side units 30A and 30B constituting part of the second refrigerant circuit 2 are connected to the first cascade unit 20 via the liquid-refrigerant connection pipe 5a and the gas-refrigerant connection pipe 5b that serve as refrigerant connection pipes.

The plurality of usage-side units 50A and 50B constituting part of the third refrigerant circuit 3 are connected to the second cascade unit 40 via the liquid-refrigerant connection pipe 6a and the gas-refrigerant connection pipe 6b that serve as refrigerant connection pipes.

Next, a configuration of the usage-side unit 30A will be described. The usage-side unit 30A and the usage-side units 30B, 50A, and 50B have the same configuration. Thus, only the configuration of the usage-side unit 30A will be described here, and description of the configurations of the usage-side units 30B, 50A, and 50B is omitted.

The usage-side unit 30A mainly includes a usage-side heat exchanger 31a and a flow-rate regulating valve 32a.

The usage-side heat exchanger 31a is a heat exchanger that functions as an evaporator for the second refrigerant and cools indoor air or functions as a radiator for the second refrigerant and heats indoor air. Here, the usage-side unit 30A includes a usage-side fan, which is not illustrated. The usage-side fan supplies indoor air as a cooling source or a heating source of the second refrigerant that flows in the usage-side heat exchanger 31a to the usage-side heat exchanger 31a.

The flow-rate regulating valve 32a is an electric expansion valve capable of regulating, while decompressing the second refrigerant, the flow rate of the second refrigerant that flows in the usage-side heat exchanger 31a. The opening degree of the flow-rate regulating valve 32a is regulated by the control unit 60 via a usage-side control unit 64.

The usage-side unit 30A is provided with various types of sensors, which are not illustrated. Values detected by each of the sensors are sent to the control unit 60 via the usage-side control unit 64.

(2-2) Heat-Source-Side Unit

The heat-source-side unit 10 constituting part of the first refrigerant circuit 1 is installed outside a room of a construction, such as a building, for example, on a rooftop or on the ground. The heat-source-side unit 10 is connected to the first cascade unit 20 or the second cascade unit 40 via the liquid-refrigerant connection pipe 4a and the gas-refrigerant connection pipe 4b.

The heat-source-side unit 10 mainly includes a compressor 11 and a heat-source-side heat exchanger 12. The heat-source-side unit 10 includes a switching mechanism 13 as a cooling-heating switching mechanism that switches between a cooling operation state in which the heat-source-side heat exchanger 12 functions as a radiator for refrigerant and a heating operation state in which the heat-source-side heat exchanger 12 functions as an evaporator for refrigerant.

The compressor 11 is a device for compressing the first refrigerant and is, for example, a compressor having a hermetic structure and in which a compression element of a positive displacement type, such as a rotary type of scroll type, is driven to rotate by a compression motor.

The heat-source-side heat exchanger 12 is a heat exchanger that functions as a radiator for the first refrigerant or functions as an evaporator for the first refrigerant. Here, the heat-source-side unit 10 includes a heat-source-side fan, which is not illustrated. The heat-source-side fan takes outdoor air into the heat-source-side unit 10 and discharges the outdoor air to the outside after causing heat to be exchanged between the outdoor air and the first refrigerant in the heat-source-side heat exchanger 12.

The first refrigerant circuit 1 is provided with an expansion valve 14 near the liquid-side end of the heat-source-side heat exchanger 12. The expansion valve 14 is an electric expansion valve that decompresses the first refrigerant in a heating operation state. The opening degree of the expansion valve 14 is regulated by the control unit 60 via a heat-source-side control unit 61.

The heat-source-side unit 10 is provided with various types of sensors, which are not illustrated. Values detected by each of the sensors are sent to the control unit 60 via the heat-source-side control unit 61.

(2-3) Cascade Unit

The first cascade unit 20 and the second cascade unit 40 are installed in a space of, for example, an attic of a room of a construction, such as a building.

The first cascade unit 20 is interposed between the usage-side units 30A and 30B and the heat-source-side unit 10 and constitutes part of the first refrigerant circuit 1 and part of the second refrigerant circuit 2.

The second cascade unit 40 is interposed between the usage-side units 50A and 50B and the heat-source-side unit 10 and constitutes part of the first refrigerant circuit 1 and part of the third refrigerant circuit 3.

Next, a configuration of the first cascade unit 20 will be described. The first cascade unit 20 and the second cascade unit 40 have the same configuration. Thus, only the configuration of the first cascade unit 20 will be described here, and description of the configuration of the second cascade unit 40 is omitted.

The first cascade unit 20 mainly includes a first cascade heat exchanger 21, a first flow-rate regulating valve 22, a compressor 24, and an expansion valve 26. The first cascade unit 20 includes a switching mechanism 25 as a cooling-heating switching mechanism that switches between a cooling operation state in which the first cascade heat exchanger 21 functions as a radiator for refrigerant and a heating operation state in which the first cascade heat exchanger 21 functions as an evaporator for refrigerant.

The first cascade heat exchanger 21 functions as an evaporator for the second refrigerant in the second refrigerant circuit 2 when functioning as a radiator for the first refrigerant in the first refrigerant circuit 1. The first cascade heat exchanger 21 functions as a radiator for the second refrigerant in the second refrigerant circuit 2 when functioning as an evaporator for the first refrigerant in the first refrigerant circuit 1. The first cascade heat exchanger 21 is a heat exchanger that exchanges heat between the first refrigerant that flows in the first refrigerant circuit 1 and the second refrigerant that flows in the second refrigerant circuit 2.

Here, the first cascade heat exchanger 21 includes a first main heat exchanging unit 21a and a first sub heat exchanging unit 21b. The first sub heat exchanging unit 21b is configured to cause the first refrigerant that has passed through the first main heat exchanging unit 21a to be in a superheating state. The superheating state is a state in which a degree of superheating has been given to the first refrigerant. A degree of superheating to be given is not limited as long as some degree of superheating is given.

The first main heat exchanging unit 21a is a heat exchanger having heat exchanging capacity larger than that of the first sub heat exchanging unit 21b. For example, the first main heat exchanging unit 21a is a plate heat exchanger, and the first sub heat exchanging unit 21b is a double pipe.

The heat exchanging capacity of a heat exchanger can be calculated by a heat transfer rate and the like. The heat exchanging capacity of a plate heat exchanger used as the first main heat exchanging unit 21a is generally larger than the heat exchanging capacity of a double pipe used as the first sub heat exchanging unit 21b.

A method of calculating the heat exchanging capacity of a heat exchanger is not specially limited.

The first refrigerant circuit 1 is provided with the first flow-rate regulating valve 22 near the liquid-side end of the first main heat exchanging unit 21a. The first flow-rate regulating valve 22 is an electric expansion valve that decompresses refrigerant during cooling operation. The valve opening degree of the first flow-rate regulating valve 22 is regulated by the control unit 60 via a first cascade control unit 62 to cause the first refrigerant that exits the first sub heat exchanging unit 21b to be in a superheating state.

The compressor 24 is a device for compressing the second refrigerant. For example, a compressor having a hermetic structure and in which a compression element of a positive displacement type, such as a rotary type or scroll type, is driven to rotate by a compression motor is used.

The switching mechanism 25 is a device capable of switching the flow of the second refrigerant in the second refrigerant circuit 2 and is constituted by, for example, a four-way switching valve.

The second refrigerant circuit 2 is provided with the expansion valve 26 near the liquid-side end of the first main heat exchanging unit 21a. The expansion valve 26 is an electric expansion valve that decompresses refrigerant during heating operation. The opening degree of the expansion valve 26 is regulated by the control unit 60 via the first cascade control unit 62.

As illustrated in FIG. 1, the first cascade unit 20 is provided with an inlet temperature sensor 23a and an outlet temperature sensor 23b. The inlet temperature sensor 23a detects a temperature (inlet temperature) of the first refrigerant at the liquid-side end of the first main heat exchanging unit 21a in the first refrigerant circuit 1. The outlet temperature sensor 23b detects a temperature (outlet temperature) of the first refrigerant at the gas-side end of the first sub heat exchanging unit 21b in the first refrigerant circuit 1. Values detected by the inlet temperature sensor 23a and the outlet temperature sensor 23b are sent to the control unit 60 via the first cascade control unit 62.

The first cascade unit 20 is also provided with various types of sensors, which are not illustrated, other than the aforementioned sensors.

(2-4) Control Unit

Figure 2:
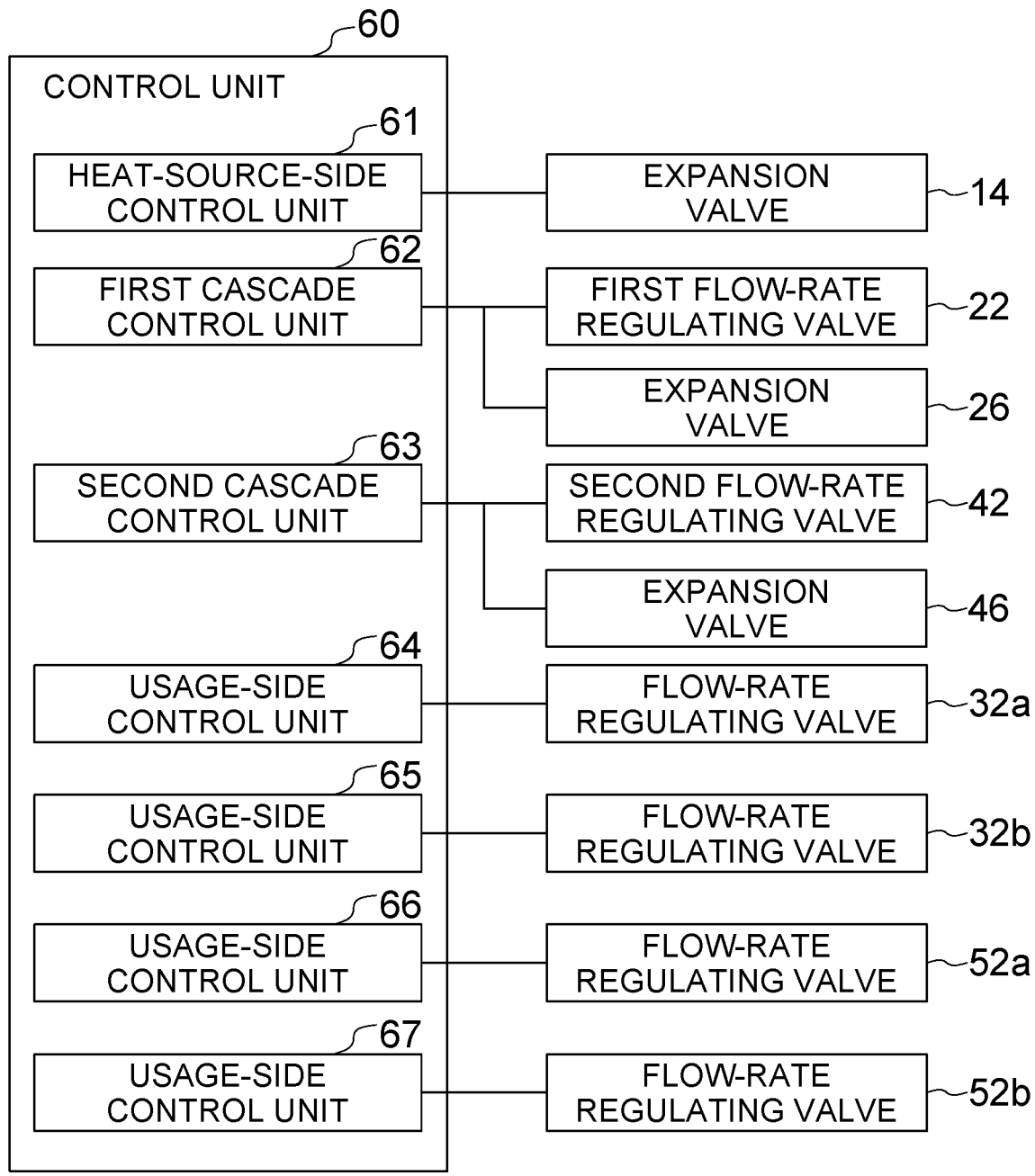
FIG. 2 is a view illustrating an outline of a control unit.

As illustrated in FIG. 2, the control unit 60 includes the heat-source-side control unit 61, the first cascade control unit 62, a second cascade control unit 63, and usage-side control units 64, 65, 66, and 67. Each of the control units 60, 61, 62, 63, 64, 65, 66, and 67 includes a processor, such as a CPU or a GPU, a memory, and the like. The processor is capable of reading a program stored in the memory and performing predetermined processing in accordance with the program.

The heat-source-side control unit 61 is disposed at the heat-source-side unit 10. The heat-source-side control unit 61 controls the entirety of the heat-source-side unit 10 and the opening degree of the expansion valve 14. The first cascade control unit 62 is disposed at the first cascade unit 20. The first cascade control unit 62 controls the entirety of the first cascade unit 20 and the opening degrees of the first flow-rate regulating valve 22 and the expansion valve 26. The second cascade control unit 63 is disposed at the second cascade unit 40. The second cascade control unit 63 controls the entirety of the second cascade unit 40 and the opening degrees of a second flow-rate regulating valve 42 and an expansion valve 46. The usage-side control unit 64 is disposed at the usage-side unit 30A. The usage-side control unit 64 controls the entirety of the usage-side unit 30A and the opening degree of the flow-rate regulating valve 32a. The usage-side control unit 65 is disposed at the usage-side unit 30B. The usage-side control unit 65 controls the entirety of the usage-side unit 30B and the opening degree of a flow-rate regulating valve 32b. The usage-side control unit 66 is disposed at the usage-side unit 50A. The usage-side control unit 66 controls the entirety of the usage-side unit 50A and the opening degree of a flow-rate regulating valve 52a. The usage-side control unit 67 is disposed at the usage-side unit 50B. The usage-side control unit 67 controls the entirety of the usage-side unit 50B and the opening degree of a flow-rate regulating valve 52b.

The control unit 60 and the control units 61, 62, 63, 64, 65, 66, and 67 each include a control board on which electric components, such as a microcomputer and a memory, are mounted. The control unit 60 controls the entirety of the air conditioning apparatus 100 via the control units 61, 62, 63, 64, 65, 66, and 67. The control unit 60 is capable of receiving values detected by each of the sensors provided at the air conditioning apparatus 100 via the control units and sending control signals and the like to each constituent device.

Specifically, the control unit 60 receives via the first cascade control unit 62 an inlet temperature that is detected by the inlet temperature sensor 23a provided at the first cascade unit 20 and an outlet temperature that is detected by the outlet temperature sensor 23b. The control unit 60 is in advance provided with opening-degree regulating algorithm for regulating the opening degree of the first flow-rate regulating valve 22. The control unit 60 uses the opening-degree regulating algorithm and generates from the inlet temperature and the outlet temperature a control signal for causing the first refrigerant that exits the first sub heat exchanging unit 21b to have an appropriate degree of superheating. The first flow-rate regulating valve 22 is capable of causing the first refrigerant that exits the first sub heat exchanging unit 21b to have an appropriate degree of superheating by regulating the opening degree of the first flow-rate regulating valve 22 on the basis of the control signal.

Regulation of the opening degree of the second flow-rate regulating valve 42 included in the second cascade unit 40 is the same as that described above. The control unit 60 receives via the second cascade control unit 63 an inlet temperature that is detected by an inlet temperature sensor 43a of the second cascade unit 40 and an outlet temperature that is detected by an outlet temperature sensor 43b. The control unit 60 uses the opening-degree regulating algorithm and sends a control signal that regulates the opening degree of the second flow-rate regulating valve 42 to the second flow-rate regulating valve 42. The second flow-rate regulating valve 42 regulates the opening degree on the basis of the control signal.

A method by which the control unit 60 regulates the opening degree of the first flow-rate regulating valve 22 or the second flow-rate regulating valve 42 is not limited thereto.

(3) Basic Operation of Air Conditioning Apparatus

Next, basic operation of the air conditioning apparatus 100 will be described. The basic operation of the air conditioning apparatus 100 includes cooling operation and heating operation. The basic operation of the air conditioning apparatus 100 described below is performed by the control unit 60 that controls constituent devices of the air conditioning apparatus 100 (the heat-source-side unit 10, the usage-side units 30A, 30B, 50A, and 50B, the first cascade unit 20, and the second cascade unit 40).

(3-1) Cooling Operation

For example, when all of the usage-side units 30A, 30B, 50A, and 50B perform cooling operation (operation in which all of the usage-side heat exchangers 31a, 31b, 51a, and 51b function as evaporators for refrigerant and the heat-source-side heat exchanger 12 functions as a radiator for refrigerant), the switching mechanisms 13, 25, and 45 are switched to a cooling operation state (the state indicated by the solid lines in FIG. 1).

(3-1-1) First Refrigerant Circuit

During cooling operation, the first refrigerant discharged from the compressor 11 and having a high pressure is sent to the heat-source-side heat exchanger 12 through the switching mechanism 13 in the first refrigerant circuit 1. In the heat-source-side heat exchanger 12 that functions as a radiator for the first refrigerant, the first refrigerant sent to the heat-source-side heat exchanger 12 condenses by exchanging heat with outdoor air supplied by the heat-source-side fan and being cooled. The first refrigerant flows out from the heat-source-side unit 10 through the expansion valve 14.

The first refrigerant that has flowed out from the heat-source-side unit 10 is sent to the first cascade unit 20 or the second cascade unit 40.

After being decompressed by the first flow-rate regulating valve 22 to an appropriate pressure, the first refrigerant sent to the first cascade unit 20 flows into the first cascade heat exchanger 21. In the first main heat exchanging unit 21a and the first sub heat exchanging unit 21b that function as evaporators for the first refrigerant, the first refrigerant sent to the first cascade heat exchanger 21 evaporates by exchanging heat with the second refrigerant that flows in the second refrigerant circuit 2 and being heated. An appropriate degree of superheating has been given to the first refrigerant that has exited the first sub heat exchanging unit 21b. The first refrigerant flows out from the first cascade unit 20 and in a state of merging with the first refrigerant that has flowed out from the second cascade unit 40 is sucked by the compressor 11.

After being decompressed by the second flow-rate regulating valve 42 to an appropriate pressure, the first refrigerant sent to the second cascade unit 40 flows into a second cascade heat exchanger 41. In a second main heat exchanging unit 41a and a second sub heat exchanging unit 41b that function as evaporators for the first refrigerant, the first refrigerant sent to the second cascade heat exchanger 41 evaporates by exchanging heat with the third refrigerant that flows in the third refrigerant circuit 3 and being heated. An appropriate degree of superheating has been given to the first refrigerant that has exited the second sub heat exchanging unit 41b. The first refrigerant flows out from the second cascade unit 40 and is in a state of merging with the first refrigerant that has flowed out from the first cascade unit 20 sucked by the compressor 11.

(3-1-2) Second Refrigerant Circuit

In the second refrigerant circuit 2, the second refrigerant discharged from the compressor 24 and having a high pressure is sent to the first cascade heat exchanger 21 through the switching mechanism 25. In the first sub heat exchanging unit 21b and the first main heat exchanging unit 21a that function as radiators for the second refrigerant, the second refrigerant sent to the first cascade heat exchanger 21 condenses by exchanging heat with the first refrigerant that flows in the first refrigerant circuit 1 and being cooled. The second refrigerant flows out from the first cascade unit 20 through the expansion valve 26. The second refrigerant that has flowed out from the first cascade unit 20 is sent to each of the usage-side units 30A and 30B.

After being decompressed by the flow-rate regulating valve 32a to an appropriate pressure, the second refrigerant sent to the usage-side unit 30A evaporates in the usage-side heat exchanger 31a that functions as an evaporator for the second refrigerant by exchanging heat with outdoor air supplied by the usage-side fan. The second refrigerant flows out from the usage-side unit 30A and in a state of merging with the second refrigerant that has flowed out from the usage-side unit 30B is suck by the compressor 24.

After being decompressed by the flow-rate regulating valve 32b to an appropriate pressure, the second refrigerant sent to the usage-side unit 30B evaporates in the usage-side heat exchanger 31b that functions as an evaporator for the second refrigerant by exchanging heat with outdoor air supplied by the usage-side fan. The second refrigerant flows out from the usage-side unit 30B and in a state of merging with the second refrigerant that has flowed out from the usage-side unit 30A is sucked by the compressor 24.

On the other hand, indoor air cooled in the usage-side heat exchangers 31a and 31b is sent to the inside of a room, thereby cooling the inside of the room.

(3-1-3) Third Refrigerant Circuit

In the third refrigerant circuit 3, the third refrigerant discharged from a compressor 44 and having a high pressure is sent to the second cascade heat exchanger 41 through the switching mechanism 45. In the second sub heat exchanging unit 41b and the second main heat exchanging unit 41a that function as radiators for the third refrigerant, the third refrigerant sent to the second cascade heat exchanger 41 condenses by exchanging heat with the first refrigerant that flows in the first refrigerant circuit 1 and being cooled. The third refrigerant flows out from the second cascade unit 40 through the expansion valve 46. The third refrigerant that has flowed out from the second cascade unit 40 is sent to each of the usage-side units 50A and 50B.

After being decompressed by the flow-rate regulating valve 52a to an appropriate pressure, the third refrigerant sent to the usage-side unit 50A evaporates in the usage-side heat exchanger 51a that functions as an evaporator for the third refrigerant by exchanging heat with outdoor air supplied by the usage-side fan. The third refrigerant flows out from the usage-side unit 50A and in a state of merging with the third refrigerant that has flowed out from the usage-side unit 50B is sucked by the compressor 44.

After being decompressed by the flow-rate regulating valve 52b to an appropriate pressure, the third refrigerant sent to the usage-side unit 50B evaporates in the usage-side heat exchanger 51b that functions as an evaporator for the third refrigerant by exchanging heat with outdoor air supplied by the usage-side fan. The third refrigerant flows out from the usage-side unit 50A and in a state of merging with the third refrigerant that has flowed out from the usage-side unit 50B is sucked by the compressor 44.

On the other hand, indoor air cooled in the usage-side heat exchangers 51a and 51b is sent to the inside of a room, thereby cooling the inside of the room.

(3-2) Heating Operation

For example, when all of the usage-side units 30A, 30B, 50A, and 50B perform heating operation (operation in which all of the usage-side heat exchangers 31a, 31b, 51a, and 51b function as radiators for refrigerant and the heat-source-side heat exchanger 12 functions as an evaporator for refrigerant), the switching mechanisms 13, 25, and 45 are switched to a heating operation state (the state indicated by the broken lines in FIG. 1).

(3-2-1) First Refrigerant Circuit

During heating operation, in the first refrigerant circuit 1, the first refrigerant discharged from the compressor 11 and having a high pressure flows out from the heat-source-side unit 10 through the switching mechanism 13.

The first refrigerant that has flowed out from the heat-source-side unit 10 is sent to the first cascade unit 20 or the second cascade unit 40.

In the first sub heat exchanging unit 21b and the first main heat exchanging unit 21a that function as radiators for refrigerant, the first refrigerant sent to the first cascade unit 20 condenses by exchanging heat with the second refrigerant that flows in the second refrigerant circuit 2 and being cooled. The first refrigerant that has condensed passes through the first flow-rate regulating valve 22 and flows out from the first cascade unit 20. In a state of merging with the first refrigerant that has flowed out from the second cascade unit 40, the first refrigerant that has flowed out from the first cascade unit 20 is sent to the heat-source-side unit 10.

In the second sub heat exchanging unit 41b and the second main heat exchanging unit 41a that function as radiators for refrigerant, the first refrigerant sent to the second cascade unit 40 condenses by exchanging heat with the third refrigerant that flows in the third refrigerant circuit 3 and being cooled. The third refrigerant that has condensed passes through the second flow-rate regulating valve 42 and flows out from the first cascade unit 20. In a state of merging with the first refrigerant that has flowed out from the first cascade unit 20, the first refrigerant that has flowed out from the second cascade unit 40 is sent to the heat-source-side unit 10.

The first refrigerant sent to the heat-source-side unit 10 is sent to the expansion valve 14. The first refrigerant sent to the expansion valve 14 is sent to the heat-source-side heat exchanger 12 after being decompressed by the expansion valve 14. The first refrigerant sent to the heat-source-side heat exchanger 12 evaporates by exchanging heat with outdoor air supplied by the heat-source-side fan and being heated. The first refrigerant that has evaporated is sucked by the compressor 11 through the switching mechanism 13.

(3-2-2) Second Refrigerant Circuit

In the second refrigerant circuit 2, during heating operation, the second refrigerant discharged from the compressor 24 and having a high pressure flows out from the first cascade unit 20 through the switching mechanism 25.

The second refrigerant that has flowed out from the first cascade unit 20 is sent to each of the usage-side units 30A and 30B.

In the usage-side heat exchanger 31a that functions as a radiator for refrigerant, the second refrigerant sent to the usage-side unit 30A condenses by exchanging heat with outdoor air supplied by the usage-side fan. The second refrigerant that has condensed passes through the flow-rate regulating valve 32a and flows out from the usage-side unit 30A. In a state of merging with the second refrigerant that has flowed out from the usage-side unit 30B, the second refrigerant that has flowed out from the usage-side unit 30A is sent to the first cascade unit 20.

In the usage-side heat exchanger 31b that functions as a radiator for refrigerant, the second refrigerant sent to the usage-side unit 30B condenses by exchanging heat with outdoor air supplied by the usage-side fan. The second refrigerant that has condensed passes through the flow-rate regulating valve 32b and flows out from the usage-side unit 30B. In a state of merging with the second refrigerant that has flowed out from the usage-side unit 30A, the second refrigerant that has flowed out from the usage-side unit 30B is sent to the first cascade unit 20.

On the other hand, indoor air heated in the usage-side heat exchangers 31a and 31b is sent to the inside of a room, thereby heating the inside of the room.

The second refrigerant that has flowed into the first cascade unit 20 flows into the expansion valve 26. The second refrigerant that has flowed into the expansion valve 26 is sent to the first cascade heat exchanger 21 after being decompressed by the expansion valve 26. In the first main heat exchanging unit 21a and the first sub heat exchanging unit 21b that function as evaporators for the second refrigerant, the second refrigerant that has flowed into the first cascade heat exchanger 21 evaporates by exchanging heat with the first refrigerant that flows in the first refrigerant circuit 1 and being heated. The second refrigerant that has evaporated is sucked by the compressor 24 through the switching mechanism 25.

(3-2-3) Third Refrigerant Circuit

In the third refrigerant circuit 3, the third refrigerant discharged from the compressor 44 and having a high pressure flows out from the second cascade unit 40 through the switching mechanism 45.

The third refrigerant that has flowed out from the second cascade unit 40 is sent to each of the usage-side units 50A and 50B.

In the usage-side heat exchanger 51a that functions as a radiator for refrigerant, the third refrigerant sent to the usage-side unit 50A condenses by exchanging heat with outdoor air supplied by the usage-side fan. The third refrigerant that has condensed passes through the flow-rate regulating valve 52a and flows out from the usage-side unit 50A. In a state of merging with the third that has flowed out from the usage-side unit 50B, the third refrigerant that has flowed out from the usage-side unit 50A is sent to the second cascade unit 40.

In the usage-side heat exchanger 51b that functions as a radiator for refrigerant, the third refrigerant sent to the usage-side unit 50B condenses by exchanging heat with outdoor air supplied by the usage-side fan. The third refrigerant that has condensed passes through the flow-rate regulating valve 52b and flows out from the usage-side unit 50B. In a state of merging with the third refrigerant that has flowed out from the usage-side unit 50A, the third refrigerant that has flowed out from the usage-side unit 50B is sent to the second cascade unit 40.

On the other hand, indoor air heated in the usage-side heat exchangers 51a and 51b is sent to the inside of a room, thereby heating the inside of the room.

The third refrigerant that has flowed into the second cascade unit 40 is sent to the expansion valve 46. The third refrigerant that has flowed into the expansion valve 46 is sent to the second cascade heat exchanger 41 after being decompressed by the expansion valve 46. In the second main heat exchanging unit 41a and the second sub heat exchanging unit 41b that function as evaporators for the third refrigerant, the third refrigerant that has flowed into the second cascade heat exchanger 41 evaporates by exchanging heat with the first refrigerant that flows in the first refrigerant circuit 1 and being heated. The third refrigerant that has evaporated is sucked by the compressor 44 through the switching mechanism 45.

(4) Modifications (4-1)

The first main heat exchanging unit 21a and the second main heat exchanging unit 41a of the air conditioning apparatus 100 are plate heat exchangers. The first sub heat exchanging unit 21b and the second sub heat exchanging unit 41b are double pipes. Each heat exchanging unit is not limited thereto.

For example, the first main heat exchanging unit 21a and the second main heat exchanging unit 41a may be heat exchangers each including a plurality of stacked flat pipes. The first sub heat exchanging unit 21b and the second sub heat exchanging unit 41b may be heat exchangers each having a structure in contact with a pipe.

The first main heat exchanging unit 21a has heat exchanging capacity larger than that of the first sub heat exchanging unit 21b. The second main heat exchanging unit 41a has heat exchanging capacity larger than that of the second sub heat exchanging unit 41b. The heat exchanging capacity of a plate heat exchanger or a heat exchanger including a plurality of stacked flat pipes is generally larger than the heat exchanging capacity of a double pipe or a heat exchanger having a structure in contact with a pipe.

(4-2)

In the first refrigerant circuit 1, the second refrigerant circuit 2, and the third refrigerant circuit 3 of the air conditioning apparatus 100, R32 having high stability of refrigerant and high performance is charged as the first refrigerant, the second refrigerant, and the third refrigerant, respectively.

(4-3)

The refrigerant cycle system presented in the present disclosure has been described by using the air conditioning apparatus 100 as a specific example of the refrigerant cycle system. The form of the refrigerant cycle system is, however, not limited thereto. For example, the refrigerant cycle system may be a heat-pump hot water supply apparatus, or the like.

(5) Features (5-1)

The air conditioning apparatus 100 as a refrigerant cycle system includes the first refrigerant circuit 1, the second refrigerant circuit 2, and the first cascade heat exchanger 21. The first refrigerant circuit 1 is a vapor compression refrigeration cycle. The second refrigerant circuit 2 is a vapor compression refrigeration cycle. The first cascade heat exchanger 21 exchanges heat between the first refrigerant that flows in the first refrigerant circuit 1 and the second refrigerant that flows in the second refrigerant circuit 2. The air conditioning apparatus 100 includes the switching mechanisms 13 and 25. The switching mechanisms 13 and 25 are each present in at least either one of the first refrigerant circuit 1 and the second refrigerant circuit 2 and switch a flow path of a refrigerant of the circuit. The first cascade heat exchanger 21 includes the first main heat exchanging unit 21a and the first sub heat exchanging unit 21b. The first sub heat exchanging unit 21b is configured to cause the first refrigerant that has passed through the first main heat exchanging unit 21a to be in a superheating state.

The air conditioning apparatus 100 further includes the first flow-rate regulating valve 22 and the control unit 60. The first flow-rate regulating valve 22 regulates the amount of the first refrigerant that flows in the first cascade heat exchanger 21 in the first refrigerant circuit 1. The control unit 60 regulates the opening degree of the first flow-rate regulating valve 22. When the first cascade heat exchanger 21 of the first refrigerant circuit 1 serves as an evaporator, the control unit 60 regulates the opening degree of the first flow-rate regulating valve 22 to cause the first refrigerant that exits the first sub heat exchanging unit 21b to be in a superheating state. Conventionally, a plate heat exchanger or a heat exchanger including a plurality of stacked flat pipes may be used in a dual refrigerant circuit configured by a vapor compression refrigeration cycle. These heat exchangers have high heat exchanging capacity and high performance and are also excellent in compact characteristics. However, controlling the degree of superheating of refrigerant in a plate heat exchanger or a heat exchanger including a plurality of stacked flat pipes decreases heat exchanging capacity and increases a pressure loss. Consequently, the performance of the plate heat exchanger or the heat exchanger including the plurality of stacked flat pipes is impaired.

However, in the air conditioning apparatus 100 according to the present embodiment, it is possible due to the aforementioned configuration to control the superheating state of the first refrigerant in the first sub heat exchanging unit 21b. It is thus possible to control the superheating state of the first refrigerant without impairing the high heat exchanging capacity of the first main heat exchanging unit 21a.

(5-2)

The first main heat exchanging unit 21a of the air conditioning apparatus 100 has heat exchanging capacity larger than that of the first sub heat exchanging unit 21b.

The first main heat exchanging unit 21a of the air conditioning apparatus 100 is a plate heat exchanger or a heat exchanger including a plurality of stacked flat pipes. The first sub heat exchanging unit 21b is a double pipe or a heat exchanger having a structure in contact with a pipe.

Due to the first sub heat exchanging unit 21b being a double pipe or a heat exchanger having a structure in contact with a pipe, it is possible to provide a cascade heat exchanger that does not impair the compact characteristics of the main heat exchangers. In addition, due to the first sub heat exchanging unit 21b being a double pipe or a heat exchanger having a structure in contact with a pipe, it is possible to reduce an increase in costs caused by the provision of the first sub heat exchanging unit 21b.

(5-3)

The air conditioning apparatus 100 further includes the third refrigerant circuit 3 and the second cascade heat exchanger 41. The third refrigerant circuit 3 is a vapor compression refrigeration cycle. The second cascade heat exchanger 41 exchanges heat between the first refrigerant that flows in the first refrigerant circuit 1 and the third refrigerant that flows in the third refrigerant circuit 3. The second cascade heat exchanger 41 includes the second main heat exchanging unit 41a and the second sub heat exchanging unit 42b. The second sub heat exchanging unit 42b is configured to cause refrigerant that has passed through the second main heat exchanging unit 41a to be in a superheating state. The first cascade heat exchanger 21 and the second cascade heat exchanger 41 are connected in parallel in the first refrigerant circuit 1.

The air conditioning apparatus 100 according to the present embodiment is also applicable to a multi-dual refrigerant circuit including a plurality of cascade units. Consequently, the number of connectable usage-side heat exchangers is increased, which increases flexibility in construction of the air conditioning apparatus 100.

(5-4)

In the first refrigerant circuit 1, the second refrigerant circuit 2, and the third refrigerant circuit 3 of the air conditioning apparatus 100, R32 having high stability is charged as the first refrigerant, the second refrigerant, and the third refrigerant, respectively. However, refrigerant other than R32 may be charged in the refrigerant cycle system presented in the present disclosure. For example, it is preferable that the first refrigerant be R32 and that the second refrigerant and the third refrigerant be carbon dioxide.

R32 has high stability of refrigerant and thus is widely used in existing refrigerant cycle systems. An existing refrigerant cycle system can be diverted into the refrigerant cycle system presented in the present disclosure.

Each of the first refrigerant, the second refrigerant, and the third refrigerant charged in the refrigerant cycle system is preferably any one of HFC refrigerant, HFO refrigerant, and natural refrigerant. Alternatively, each of the first refrigerant and the second refrigerant is preferably a mixture refrigerant that contains any two or more of HFC refrigerant, HFO refrigerant, natural refrigerant, and $CF_3I$. Specifically, the HFC refrigerant is R32, R125, R134a, R143a, R245fa, or the like. The HFO refrigerant is R1234yf, R1234zd, R1123, R1132(E), or the like. The natural refrigerant is R744, R717, R290, R600a, R1270, or the like.

Second Embodiment (1) Overall Configuration

Figure 3:
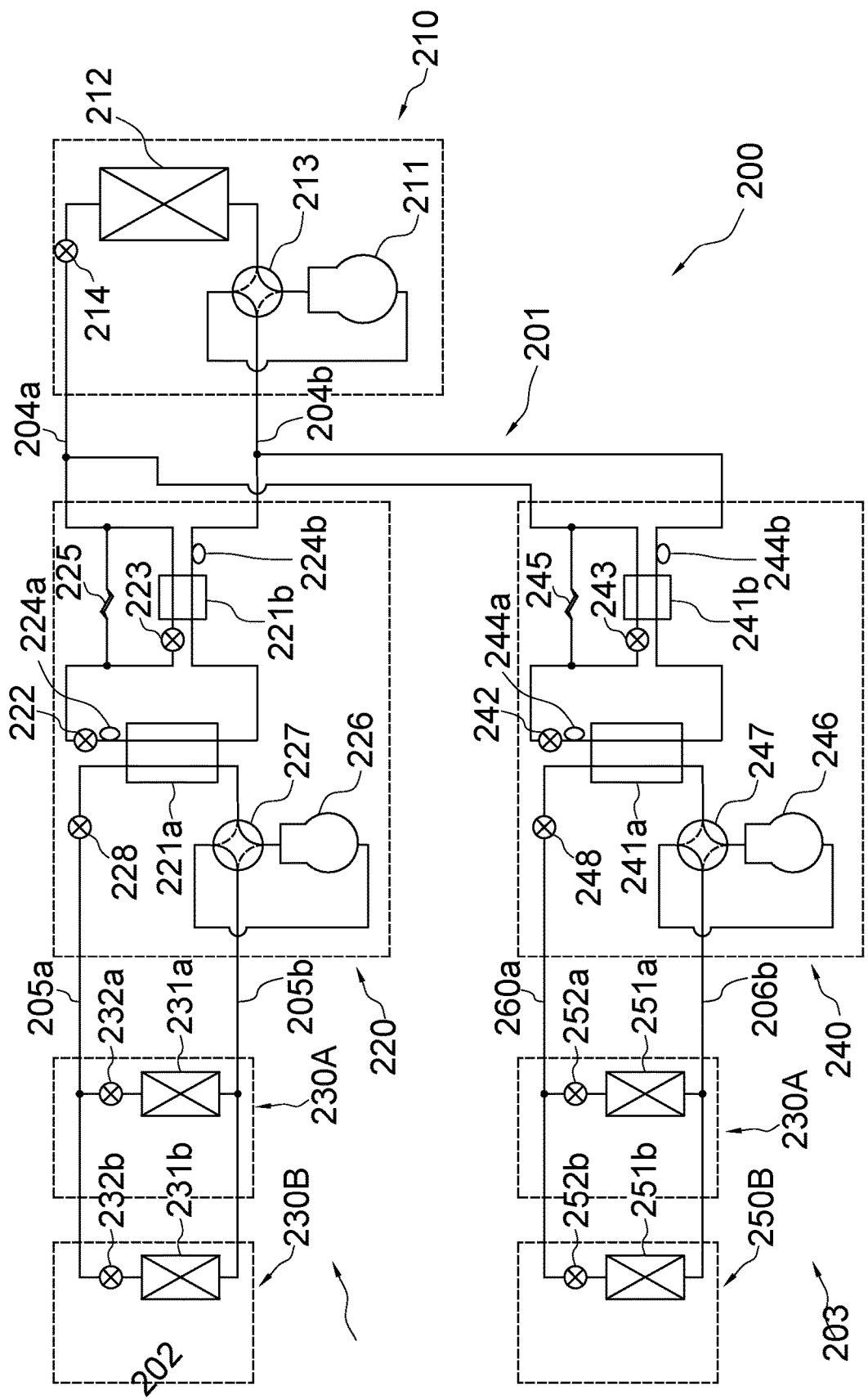
FIG. 3 is a view illustrating a refrigerant circuit of an air conditioning apparatus.

As illustrated in FIG. 3, an air conditioning apparatus 200 as one embodiment of a refrigerant cycle apparatus is an apparatus that cools and heats a room in a construction, such as a building, by a first refrigerant circuit 201, a second refrigerant circuit 202, and a third refrigerant circuit 203 that are vapor compression refrigeration cycles.

The air conditioning apparatus 200 mainly includes a heat-source-side unit 210 that belongs to the first refrigerant circuit 201, a plurality of usage-side units 230A and 230B (two in the present embodiment) that belong to the second refrigerant circuit 202, a plurality of usage-side units 250A and 250B (two in the present embodiment) that belong to the third refrigerant circuit 203, a first cascade unit 220 that is disposed between the heat-source-side unit 210 and the usage-side units 230A and 230B, a second cascade unit 240 that is disposed between the heat-source-side unit 210 and the usage-side units 250A and 250B, refrigerant connection pipes 204a, 204b, 205a, 205b, 206a, and 206b, and a control unit 260.

The first cascade unit 220 and the second cascade unit 240 are connected in parallel to each other in the first refrigerant circuit 201. The plurality of usage-side units 230A and 230B are connected in parallel to each other in the second refrigerant circuit 202. The plurality of usage-side units 250A and 250B are connected in parallel to each other in the third refrigerant circuit 203.

The control unit 260 is connected to a control unit of each unit via a transmission line and the like. The control unit 260 controls each constituent device included in the air conditioning apparatus 200 and controls the entirety of the air conditioning apparatus 200.

R32 is charged as a first refrigerant, a second refrigerant, and a third refrigerant in the first refrigerant circuit 201, the second refrigerant circuit 202, and the third refrigerant circuit 203, respectively.

(2) Detailed Configuration of Each Unit
(2-1) Usage-Side Unit

The usage-side units 230A, 230B, 250A, and 250B are installed inside a room of a building or the like.

The plurality of usage-side units 230A and 230B constituting part of the second refrigerant circuit 202 are connected to the first cascade unit 220 via a liquid-refrigerant connection pipe 205a and a gas-refrigerant connection pipe 205b that serve as refrigerant connection pipes.

The plurality of usage-side units 250A and 250B constituting part of the third refrigerant circuit 203 are connected to the second cascade unit 240 via a liquid-refrigerant connection pipe 206a and a gas-refrigerant connection pipe 206b that serve as refrigerant connection pipes.

Next, a configuration of the usage-side unit 230A will be described. The usage-side unit 230A and the usage-side units 230B, 250A, and 250B have the same configuration. Thus, only the configuration of the usage-side unit 230A will be described here, and description of the configurations of the usage-side units 230B, 250A, and 250B is omitted.

The usage-side unit 230A mainly includes a usage-side heat exchanger 231a and a flow-rate regulating valve 232a. Each constituent device of the usage-side unit 230A is controlled by the control unit 260 via a usage-side control unit 264.

The usage-side heat exchanger 231a is a heat exchanger that functions as an evaporator for the second refrigerant and cools indoor air or functions as a radiator for the second refrigerant and heats indoor air. Here, the usage-side unit 230A includes a usage-side fan, which is not illustrated. The usage-side fan supplies indoor air as a cooling source or a heating source of the second refrigerant that flows in the usage-side heat exchanger 231a to the usage-side heat exchanger 231a.

The flow-rate regulating valve 232a is an electric expansion valve capable of regulating, while decompressing the second refrigerant, the flow rate of the second refrigerant that flows in the usage-side heat exchanger 231a. The opening degree of the flow-rate regulating valve 232a is regulated by the control unit 260 via the usage-side control unit 264.

The usage-side unit 230A is provided with various types of sensors, which are not illustrated. Values detected by each of the sensors are sent to the control unit 260 via the usage-side control unit 264.

(2-2) Heat-Source-Side Unit

The heat-source-side unit 210 constituting part of the first refrigerant circuit 201 is installed outside a room of a construction, such as a building, for example, on a rooftop or on the ground. The heat-source-side unit 210 is connected to the first cascade unit 220 or the second cascade unit 240 via the liquid-refrigerant connection pipe 204a and the gas-refrigerant connection pipe 204b.

The heat-source-side unit 210 mainly includes a compressor 211 and a heat-source-side heat exchanger 212. The heat-source-side unit 210 includes a switching mechanism 213 as a cooling-heating switching mechanism that switches between a cooling operation state in which the heat-source-side heat exchanger 212 functions as a radiator for refrigerant and a heating operation state in which the heat-source-side heat exchanger 212 functions as an evaporator for refrigerant. Each constituent device of the heat-source-side unit 210 is controlled by the control unit 260 via a heat-source-side control unit 261.

The compressor 211 is a device for compressing the first refrigerant and is, for example, a compressor having a hermetic structure and in which a compression element of a positive-displacement type, such as a rotary type or scroll type, is driven to rotate by a compression motor.

The heat-source-side heat exchanger 212 is a heat exchanger that functions as a radiator for the first refrigerant or functions as an evaporator for the first refrigerant. Here, the heat-source-side unit 210 includes a heat-source-side fan, which is not illustrated. The heat-source-side fan takes outdoor air into the heat-source-side unit 210 and discharges the outdoor air to the outside after causing heat to be exchanged between the outdoor air and the first refrigerant in the heat-source-side heat exchanger 212.

The first refrigerant circuit 201 is provided with an expansion valve 214 near the liquid-side end of the heat-source-side heat exchanger 212. The expansion valve 214 is an electric expansion valve that decompresses the first refrigerant in a heating operation state. The opening degree of the expansion valve 214 is regulated by the control unit 260 via the heat-source-side control unit 261.

The heat-source-side unit 210 is provided with various types of sensors, which are not illustrated. Values detected by each of the sensors are sent to the control unit 260 via the heat-source-side control unit 261.

(2-3) Cascade Unit

The first cascade unit 220 and the second cascade unit 240 are installed in a space of, for example, an attic of a room of a construction, such as a building.

The first cascade unit 220 is interposed between the usage-side units 230A and 230B and the heat-source-side unit 210 and constitutes part of the first refrigerant circuit 201 and part of the second refrigerant circuit 202.

The second cascade unit 240 is interposed between the usage-side units 250A and 250B and the heat-source-side unit 210 and constitutes part of the first refrigerant circuit 201 and part of the third refrigerant circuit 203.

Next, a configuration of the first cascade unit 220 will be described. The first cascade unit 220 and the second cascade unit 240 have the same configuration. Thus, only the configuration of the first cascade unit 220 will be described here, and description of the configuration of the second cascade unit 240 is omitted.

The first cascade unit 220 mainly includes a first main heat exchanging unit 221a, a first sub heat exchanging unit 221b, a first flow-rate regulating valve 222, a first bypass circuit 225, a first bypass valve 223, a compressor 226, and an expansion valve 228. The first cascade unit 220 includes a switching mechanism 227 that serves as a cooling-heating switching mechanism. Each constituent device of the first cascade unit 220 is controlled by the control unit 260 via a first cascade control unit 262.

When functioning as a radiator for the first refrigerant in the first refrigerant circuit 201, the first main heat exchanging unit 221a functions as an evaporator for the second refrigerant in the second refrigerant circuit 202. When functioning as an evaporator for the first refrigerant in the first refrigerant circuit 201, the first main heat exchanging unit 221a functions as a radiator for the second refrigerant in the second refrigerant circuit 202. The first main heat exchanging unit 221a is a heat exchanger that exchanges heat between the first refrigerant that flows in the first refrigerant circuit 201 and the second refrigerant that flows in the second refrigerant circuit 202.

The first sub heat exchanging unit 221b is configured to cause the first refrigerant that has passed through the first main heat exchanging unit 221a to be in a superheating state. The superheating state is a state in which a degree of superheating has been given to the first refrigerant. A degree of superheating to be given is not limited as long as some degree of superheating is given. In a cooling operation state, the first sub heat exchanging unit 221b exchanges heat between the first refrigerant that has not entered the first main heat exchanging unit 221a yet and the first refrigerant that has exited the first main heat exchanging unit 221a. In a heating operation state, the first bypass valve 223, which will be described later, is fully closed. Consequently, the first refrigerant that has exited the first main heat exchanging unit 221a flows out from the first cascade unit 220 via the first bypass circuit 225, which will be described later. The first sub heat exchanging unit 221b thus does not exchange heat.

The first main heat exchanging unit 221a is a heat exchanger having heat exchanging capacity larger than that of the first sub heat exchanging unit 221b. For example, the first main heat exchanging unit 221a is a plate heat exchanger, and the first sub heat exchanging unit 221b is a double pipe.

The heat exchanging capacity of a heat exchanger can be calculated by a heat transfer rate and the like. The heat exchanging capacity of a plate heat exchanger used as the first main heat exchanging unit 221a is generally larger than the heat exchanging capacity of a double pipe used as the first sub heat exchanging unit 221b.

A method of calculating the heat exchanging capacity of a heat exchanger is not limited.

The first refrigerant circuit 201 is provided with the first flow-rate regulating valve 222 near the liquid-side end of the first main heat exchanging unit 221a. The first flow-rate regulating valve 222 is an electric expansion valve that decompresses the first refrigerant in a cooling operation state. The valve opening degree of the first flow-rate regulating valve 222 is regulated by the control unit 260 via the first cascade control unit 262 to cause the first refrigerant that exits the first sub heat exchanging unit 221b to be in a superheating state.

The first bypass circuit 225 is, for example, a capillary. In the first refrigerant circuit 201 in a heating operation state, the first refrigerant that has exited the first main heat exchanging unit 221a bypasses the first sub heat exchanging unit 221b via the first bypass circuit 225. The first refrigerant that has bypassed the first sub heat exchanging unit 221b flows out from the first cascade unit 220.

In the first refrigerant circuit 201 in a heating operation state, the first bypass valve 223 is provided on the upstream side of the first sub heat exchanging unit 221b. The first bypass valve 223 is fully closed in a heating operation state. Consequently, the first refrigerant that has exited the first main heat exchanging unit 221a flows out from the first cascade unit 220 via the first bypass circuit 225, and the first sub heat exchanging unit 221b does not exchange heat. The first bypass valve 223 is an electric expansion valve, and the valve opening degree of the first bypass valve 223 is regulated by the control unit 260 via the first cascade control unit 262.

The compressor 226 is a device for compressing the second refrigerant. For example, a compressor having a hermetic structure and in which a compression element of a positive displacement type, such as a rotary type or scroll type, is driven to rotate by a compression motor is used.

The second refrigerant circuit 202 is provided with the expansion valve 228 near the liquid-side end of the first main heat exchanging unit 221a. The expansion valve 228 is an electric expansion valve that decompresses refrigerant in a heating operation state. The opening degree of the expansion valve 228 is regulated by the control unit 260 via the first cascade control unit 262.

As illustrated in FIG. 3, the first cascade unit 220 is further provided with an inlet temperature sensor 224a and an outlet temperature sensor 224b. The inlet temperature sensor 224a detects a temperature (inlet temperature) of the first refrigerant at the liquid-side end of the first main heat exchanging unit 221a in the first refrigerant circuit 201. The outlet temperature sensor 224b detects a temperature (outlet temperature) of the first refrigerant at the gas-side end of the first sub heat exchanging unit 221b in the first refrigerant circuit 201. Values detected by the inlet temperature sensor 224a and the outlet temperature sensor 224b are sent to the control unit 260 via the first cascade control unit 262.

The first cascade unit 220 is also provided with various types of sensors, which are not illustrated, other than the aforementioned sensors.

(2-4) Control Unit

Figure 4:
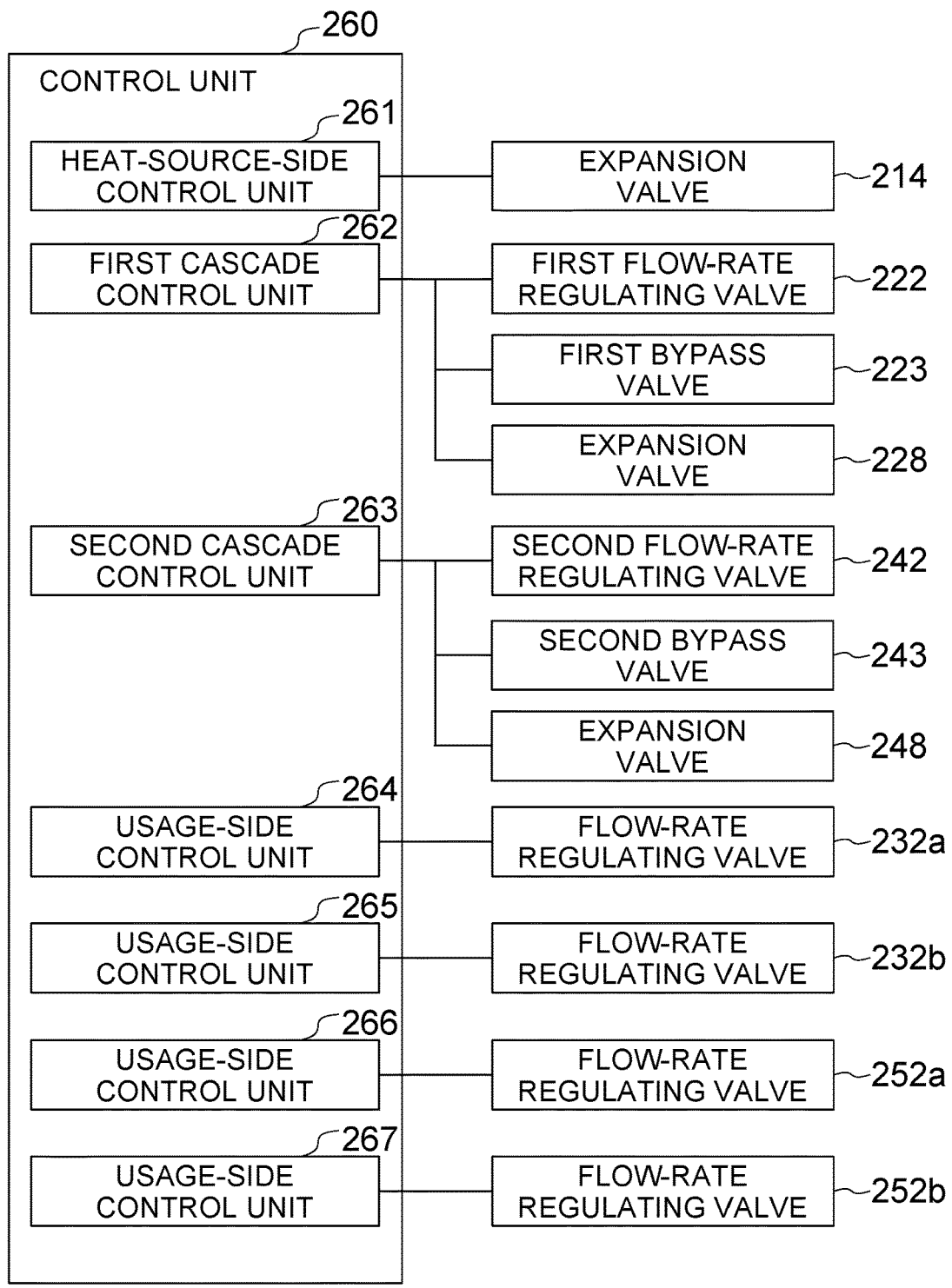
FIG. 4 is a view illustrating an outline of a control unit.

As illustrated in FIG. 4, the control unit 260 includes the heat-source-side control unit 261, the first cascade control unit 262, a 2 second cascade control unit 263, and usage-side control units 264, 265, 266, and 267. Each of the control units 260, 261, 262, 263, 264, 265, 266, and 267 includes a processor, such as a CPU or a GPU, a memory, and the like. The processor is capable of reading a program stored in the memory and performing predetermined processing in accordance with the program.

The heat-source-side control unit 261 is disposed at the heat-source-side unit 210. The heat-source-side control unit 261 controls the entirety of the heat-source-side unit 210 and the opening degree of the expansion valve 214. The first cascade control unit 262 is disposed at the first cascade unit 220. The first cascade control unit 262 controls the entirety of the first cascade unit 220 and the opening degrees of the first flow-rate regulating valve 222, the first bypass valve 223, and the expansion valve 228. The second cascade control unit 263 is disposed at the second cascade unit 240. The second cascade control unit 263 controls the entirety of the second cascade unit 240 and the opening degrees of a second flow-rate regulating valve 242, a second bypass valve 243, and an expansion valve 248. The usage-side control unit 264 is disposed at the usage-side unit 230A. The usage-side control unit 264 controls the entirety of the usage-side unit 230A and the opening degree of the flow-rate regulating valve 232a. The usage-side control unit 265 is disposed at the usage-side unit 230B. The usage-side control unit 265 controls the entirety of the usage-side unit 230B and the opening degree of a flow-rate regulating valve 232b. The usage-side control unit 266 is disposed at the usage-side unit 250A. The usage-side control unit 266 controls the entirety of the usage-side unit 250A and the opening degree of a flow-rate regulating valve 252*a*. The usage-side control unit 267 is disposed at the usage-side unit 250B. The usage-side control unit 267 controls the entirety of the usage-side unit 250B and the opening degree of a flow-rate regulating valve 252*b*.

The control unit 260 and the control units 261, 262, 263, 264, 265, 266, and 267 each include a control board on which electric components, such as a microcomputer and a memory, are mounted. The control unit 260 controls the entirety of the air conditioning apparatus 200 via the control units 261, 262, 263, 264, 265, 266, and 267. The control unit 260 is capable of receiving values detected by the sensors provided at the air conditioning apparatus 200 via the control units 261, 262, 263, 264, 265, 266, and 267 and sending control signals and the like to each constituent device.

Specifically, for example, the control unit 260 receives via the first cascade control unit 262 an inlet temperature that is detected by the inlet temperature sensor 224*a* provided at the first cascade unit 220 and an outlet temperature that is detected by the outlet temperature sensor 224*b*. The control unit 260 is in advance provided with opening-degree regulating algorithm for regulating the opening degree of the first flow-rate regulating valve 222. The control unit 260 uses the opening-degree regulating algorithm and generates from the inlet temperature and the outlet temperature a control signal for causing the first refrigerant that exits the first sub heat exchanging unit 221*b* to have an appropriate degree of superheating. The first flow-rate regulating valve 222 is capable of causing the first refrigerant that exits the first sub heat exchanging unit 221*b* to have an appropriate degree of superheating by regulating the opening degree of the first flow-rate regulating valve 222 on the basis of the control signal.

Regulation of the opening degree of the second flow-rate regulating valve 242 included in the second cascade unit 240 is the same as that described above. The control unit 260 receives via the second cascade control unit 263 an inlet temperature that is detected by an inlet temperature sensor 244*a* of the second cascade unit 240 and an outlet temperature that is detected by an outlet temperature sensor 244*b*. The control unit 260 uses the opening-degree regulating algorithm and sends a control signal that regulates the opening degree of the second flow-rate regulating valve 242 to the second flow-rate regulating valve 242. The second flow-rate regulating valve 242 regulates the opening degree on the basis of the control signal.

A method by which the control unit 260 regulates the opening degree of the first flow-rate regulating valve 222 or the second flow-rate regulating valve 242 is not limited thereto.

(3) Basic Operation of Air Conditioning Apparatus

Next, basic operation of the air conditioning apparatus 200 will be described. The basic operation of the air conditioning apparatus 200 includes cooling operation and heating operation. The basic operation of the air conditioning apparatus 200 described below is performed by the control unit 260 that controls constituent devices of the air conditioning apparatus 200 (the heat-source-side unit 210, the usage-side units 230A, 230B, 250A, and 250B, the first cascade unit 220, and the second cascade unit 240).

(3-1) Cooling Operation

For example, when all of the usage-side units 230A, 230B, 250A, and 250B perform cooling operation (operation in which all of the usage-side heat exchangers 231*a*, 231*b*, 251*a*, and 251*b* function as evaporators for refrigerant and the heat-source-side heat exchanger 212 functions as a radiator for refrigerant), the switching mechanisms 213, 227, and 247 are switched to a cooling operation state (the state indicated by the solid lines in FIG. 3).

(3-1-1) First Refrigerant Circuit

During cooling operation, the first refrigerant discharged from the compressor 211 and having a high pressure is sent to the heat-source-side heat exchanger 212 through the switching mechanism 213 in the first refrigerant circuit 201. The first refrigerant sent to the heat-source-side heat exchanger 212 condenses in the heat-source-side heat exchanger 212 that functions as a radiator for the first refrigerant by exchanging heat with outdoor air supplied by the heat-source-side fan and being cooled. The first refrigerant flows out from the heat-source-side unit 210 through the expansion valve 214.

The first refrigerant that has flowed out from the heat-source-side unit 210 is sent to the first cascade unit 220 and the second cascade unit 240.

The first refrigerant that has flowed into the first cascade unit 220 enters the first sub heat exchanging unit 221*b*. The first refrigerant that has entered the first sub heat exchanging unit 221*b* exchanges heat with the first refrigerant that has exited the first main heat exchanging unit 221*a*. The first refrigerant exits the first sub heat exchanging unit 221*b* and passes through the first bypass valve 223. The first refrigerant then enters the first flow-rate regulating valve 222 whose opening degree is appropriately regulated by the control unit 260 and is decompressed. The decompressed first refrigerant enters the first main heat exchanging unit 221*a*. In the first main heat exchanging unit 221*a* that functions as an evaporator for the first refrigerant, the first refrigerant evaporates by exchanging heat with the second refrigerant that flows in the second refrigerant circuit 202 and being heated. The first refrigerant that has exited the first sub heat exchanging unit 221*b* enters the first sub heat exchanging unit 221*b* and exchanges heat with the first refrigerant that has not entered the first main heat exchanging unit 221*a* yet. An appropriate degree of superheating has been given to the first refrigerant that has exchanged heat here and exited the first sub heat exchanging unit 221*b*. The first refrigerant flows out from the first cascade unit 220 and is sucked in a state of merging with the first refrigerant that has flowed out from the second cascade unit 240 by the compressor 211.

The first refrigerant that has flowed into the second cascade unit 240 enters a second sub heat exchanging unit 241*b*. The first refrigerant that has entered the second sub heat exchanging unit 241*b* exchanges heat with the first refrigerant that has exited a second main heat exchanging unit 241*a*. The first refrigerant exits the second sub heat exchanging unit 241*b* and passes through the second bypass valve 243. The first refrigerant then enters the second flow-rate regulating valve 242 whose opening degree is appropriately regulated by the control unit 260 and is decompressed. The decompressed first refrigerant enters a second heat exchanger 241. The first refrigerant that has entered the second heat exchanger 241 evaporates in the second main heat exchanging unit 241*a* that functions as an evaporator for the first refrigerant by exchanging heat with the third refrigerant that flows in the third refrigerant circuit 203 and being heated. The first refrigerant that has exited the second sub heat exchanging unit 241*b* enters the second sub heat exchanging unit 241*b* and exchanges heat with the first refrigerant that has not entered the second main heat exchanging unit 241*a* yet. An appropriate degree of superheating has been given to the first refrigerant that has exchanged heat here and exited the second sub heat exchanging unit 241b. The first refrigerant flows out from the second cascade unit 240 and in a state of merging with the first refrigerant that has flowed out from the first cascade unit 220 is sucked by the compressor 211.

(3-1-2) Second Refrigerant Circuit

In the second refrigerant circuit 202, the second refrigerant discharged from the compressor 226 and having a high pressure is sent to the first main heat exchanging unit 221a through the switching mechanism 227 in the second refrigerant circuit 202. In the first main heat exchanging unit 221a that functions as a radiator for the second refrigerant, the second refrigerant condenses by exchanging heat with the first refrigerant that flows in the first refrigerant circuit 201 and being cooled. The second refrigerant flows out from the first cascade unit 220 through the expansion valve 228. The second refrigerant that has flowed out from the first cascade unit 220 is sent to each of the usage-side units 230A and 230B.

After being decompressed by the flow-rate regulating valve 232a to an appropriate pressure, the second refrigerant sent to the usage-side unit 230A evaporates in the usage-side heat exchanger 231a that functions as an evaporator for the second refrigerant by exchanging heat with outdoor air supplied by the usage-side fan. The second refrigerant flows out from the usage-side unit 230A and in a state of merging with the second refrigerant that has flowed out from the usage-side unit 230B is sucked by the compressor 226.

After being decompressed by the flow-rate regulating valve 232b to an appropriate pressure, the second refrigerant sent to the usage-side unit 230B evaporates in the usage-side heat exchanger 231b that functions as an evaporator for the second refrigerant by exchanging heat with outdoor air supplied by the usage-side fan. The second refrigerant flows out from the usage-side unit 230B and is in a state of merging with the second refrigerant that has flowed out from the usage-side unit 230A sucked by the compressor 226.

Indoor air cooled in the usage-side heat exchangers 231a and 231b is sent to the inside of a room, thereby cooling the inside of the room.

(3-1-3) Third Refrigerant Circuit

In the third refrigerant circuit 203, the third refrigerant discharged from a compressor 244 and having a high pressure is sent to the second main heat exchanging unit 241a through the switching mechanism 247. The third refrigerant sent to the second main heat exchanging unit 241a condenses in the second main heat exchanging unit 241a that functions as a radiator for the third refrigerant by exchanging heat with the first refrigerant that flows in the first refrigerant circuit 201 and being cooled. The third refrigerant flows out from the second cascade unit 240 through an expansion valve 246. The third refrigerant that has flowed out from the second cascade unit 240 is sent to each of the usage-side units 250A and 250B.

After being decompressed by the flow-rate regulating valve 252a to an appropriate pressure, the third refrigerant sent to the usage-side unit 250A evaporates in the usage-side heat exchanger 251a that functions as an evaporator for the third refrigerant by exchanging heat with outdoor air supplied by the usage-side fan. The third refrigerant flows out from the usage-side unit 250A and in a state of merging with the third refrigerant that has flowed out from the usage-side unit 250B is sucked by the compressor 244.

After being decompressed by the flow-rate regulating valve 252b to an appropriate pressure, the third refrigerant sent to the usage-side unit 250B evaporates in the usage-side heat exchanger 251b that functions as an evaporator for the third refrigerant by exchanging heat with outdoor air supplied by the usage-side fan. The third refrigerant flows out from the usage-side unit 250A and in a state of merging with the third refrigerant that has flowed out from the usage-side unit 250B is sucked by the compressor 244.

Indoor air cooled in the usage-side heat exchangers 251a and 251b is sent to the inside of a room, thereby cooling the inside of the room.

(3-2) Heating Operation

For example, when all of the usage-side units 230A, 230B, 250A, and 250B perform heating operation (operation in which all of the usage-side heat exchangers 231a, 231b, 251a, and 251b function as radiators for refrigerant and the heat-source-side heat exchanger 212 functions as an evaporator for refrigerant), the switching mechanisms 213, 227, and 247 are switched to a heating operation state (the state indicated by the broken lines in FIG. 3).

(3-2-1) First Refrigerant Circuit

During heating operation, in the first refrigerant circuit 201, the first refrigerant discharged from the compressor 211 and having a high pressure flows out from the heat-source-side unit 210 through the switching mechanism 213.

The first refrigerant that has flowed out from the heat-source-side unit 210 is sent to the first cascade unit 220 and the second cascade unit 240.

The first refrigerant sent to the first cascade unit 220 passes through the first sub heat exchanging unit 221b and enters the first main heat exchanging unit 221a. At this time, the first refrigerant does not exchange heat in the first sub heat exchanging unit 221b. The first refrigerant that has entered the first main heat exchanging unit 221a condenses by exchanging heat with the second refrigerant that flows in the second refrigerant circuit 202 and being cooled. The first refrigerant that has condensed passes through the first flow-rate regulating valve 222. Here, the first bypass valve 223 has an opening degree regulated by the control unit 260 and is in a fully closed state. The first refrigerant that has passed through the first flow-rate regulating valve 222 bypasses the first sub heat exchanging unit 221b via the first bypass circuit 225. The first refrigerant flows out from the first cascade unit 220. In a state of merging with the first refrigerant that has flowed out from the second cascade unit 240, the first refrigerant that has flowed out from the first cascade unit 220 is sent to the heat-source-side unit 210.

The first refrigerant sent to the second cascade unit 240 passes through the second sub heat exchanging unit 241b and enters the second main heat exchanging unit 241a. At this time, the first refrigerant does not exchange heat in the second sub heat exchanging unit 241b. The first refrigerant that has entered the second main heat exchanging unit 241a condenses by exchanging heat with the third refrigerant that flows in the third refrigerant circuit 203 and being cooled. The first refrigerant that has condensed passes through the second flow-rate regulating valve 242. Here, the second bypass valve 243 has an opening degree regulated by the control unit 260 and is in a fully closed state. The first refrigerant that has passed through the second flow-rate regulating valve 242 bypasses the second sub heat exchanging unit 241b via a second bypass circuit 245. The first refrigerant flows out from the second cascade unit 240. In a state of merging with the first refrigerant that has flowed out from the first cascade unit 220, the first refrigerant that has flowed out from the second cascade unit 240 is sent to the heat-source-side unit 210.

The first refrigerant sent to the heat-source-side unit 210 is sent to the expansion valve 214. After being decompressed by the expansion valve 214 whose opening degree is regulated by the control unit 260, the first refrigerant sent to the expansion valve 214 is sent to the heat-source-side heat exchanger 212. The first refrigerant that has entered the heat-source-side heat exchanger 212 evaporates by exchanging heat with outdoor air supplied by the heat-source-side fan and being heated. The first refrigerant that has evaporated is sucked by the compressor 211 through the switching mechanism 213.

(3-2-2) Second Refrigerant Circuit

In the second refrigerant circuit 202, during heating operation, the second refrigerant discharged from the compressor 226 and having a high pressure flows out from the first cascade unit 220 through the switching mechanism 227.

The second refrigerant that has flowed out from the first cascade unit 220 is sent to each of the usage-side units 230A and 230B.

The second refrigerant sent to the usage-side unit 230A condenses in the usage-side heat exchanger 231a that functions as a radiator for refrigerant by exchanging heat with outdoor air supplied by the usage-side fan. The second refrigerant that has condensed passes through the flow-rate regulating valve 232a and flows out from the usage-side unit 230A. In a state of merging with the second refrigerant that has flowed out from the usage-side unit 230B, the second refrigerant that has flowed out from the usage-side unit 230A is sent to the first cascade unit 220.

The second refrigerant sent to the usage-side unit 230B condenses in the usage-side heat exchanger 231b that functions as a radiator for refrigerant by exchanging heat with outdoor air supplied by the usage-side fan. The second refrigerant that has condensed passes through the flow-rate regulating valve 232b and flows out from the usage-side unit 230B. In a state of merging with the second refrigerant that has flowed out from the usage-side unit 230A, the second refrigerant that has flowed out from the usage-side unit 230B is sent to the first cascade unit 220.

Indoor air heated in the usage-side heat exchangers 231a and 231b is sent to the inside of a room, thereby heating the inside of the room.

The second refrigerant that has flowed into the first cascade unit 220 flows into the expansion valve 228. The second refrigerant that has flowed into the expansion valve 228 is sent to the first main heat exchanging unit 221a after being decompressed by the expansion valve 228. In the first main heat exchanging unit 221a that functions as an evaporator for the second refrigerant, the second refrigerant evaporates by exchanging heat with the first refrigerant that flows in the first refrigerant circuit 201 and being heated. The second refrigerant that has evaporated is sucked by the compressor 226 through the switching mechanism 227.

(3-2-3) Third Refrigerant Circuit

In the third refrigerant circuit 203, the third refrigerant discharged from the compressor 244 and having a high pressure flows out from the second cascade unit 240 through the switching mechanism 247.

The third refrigerant that has flowed out from the second cascade unit 240 is sent to each of the usage-side units 250A and 250B.

The third refrigerant sent to the usage-side unit 250A condenses in the usage-side heat exchanger 251a that functions as a radiator for refrigerant by exchanging heat with outdoor air supplied by the usage-side fan. The third refrigerant that has condensed passes through the flow-rate regulating valve 252a and flows out from the usage-side unit 250A. In a state of merging with the third refrigerant that has flowed out from the usage-side unit 250B, the third refrigerant that has flowed out from the usage-side unit 250A is sent to the second cascade unit 240.

The third refrigerant sent to the usage-side unit 250B condenses in the usage-side heat exchanger 251b that functions as a radiator for refrigerant by exchanging heat with outdoor air supplied by the usage-side fan. The third refrigerant that has condensed passes through the flow-rate regulating valve 252b and flows out from the usage-side unit 250B. In a state of merging with the third refrigerant that has flowed out from the usage-side unit 250A, the third refrigerant that has flowed out from the usage-side unit 250B is sent to the second cascade unit 240.

Indoor air heated in the usage-side heat exchangers 251a and 251b is sent to the inside of a room, thereby heating the inside of the room.

The third refrigerant that has flowed into the second cascade unit 240 is sent to the expansion valve 246. The third refrigerant that has flowed into the expansion valve 246 is sent to the second main heat exchanging unit 241a after being decompressed by the expansion valve 246. The third refrigerant that has flowed into the second main heat exchanging unit 241a evaporates in the second main heat exchanging unit 241a that functions as an evaporator for the third refrigerant by exchanging heat with the first refrigerant that flows in the first refrigerant circuit 201 and being heated. The third refrigerant that has evaporated is sucked by the compressor 244 through the switching mechanism 247.

(4) Modifications (4-1)

The first main heat exchanging unit 221a and the second main heat exchanging unit 241a of the air conditioning apparatus 200 are plate heat exchangers, and the first sub heat exchanging unit 221b and the second sub heat exchanging unit 241b are double pipes. Each heat exchanging unit is not limited thereto.

For example, the first main heat exchanging unit 221a and the second main heat exchanging unit 241a may be heat exchangers each including a plurality of stacked flat pipes, and the first sub heat exchanging unit 221b and the second sub heat exchanging unit 241b may be heat exchangers each having a structure in contact with a pipe.

The first main heat exchanging unit 221a is at least a heat exchanger having heat exchanging capacity larger than that of the first sub heat exchanging unit 221b. The second main heat exchanging unit 241a is at least a heat exchanger having heat exchanging capacity larger than that of the second sub heat exchanging unit 241b.

The heat exchanging capacity of a plate heat exchanger or a heat exchanger including a plurality of stacked flat pipes is generally larger than the heat exchanging capacity of a double pipe or a heat exchanger having a structure in contact with a pipe.

(4-2)

As illustrated in FIG. 3, the first cascade unit 220 of the air conditioning apparatus 200 is provided with the inlet temperature sensor 224a at the liquid-side end of the first main heat exchanging unit 221a and provided with the outlet temperature sensor 224b at the gas-side end of the first sub heat exchanging unit 221b. Arrangements of the inlet temperature sensor and the outlet temperature sensor are, however, not limited thereto.

For example, when the first refrigerant circuit 201 performs cooling operation, the outlet temperature sensor 224b may be provided at an outlet of the first main heat exchanging unit 221a.

(4-3)

The first bypass circuit 225 and the second bypass circuit 245 of the air conditioning apparatus 200 are capillaries. The forms of the first bypass circuit 225 and the second bypass circuit 245 are, however, not limited thereto. For example, the first bypass circuit 225 and the second bypass circuit 245 may be electric expansion valves, electric on-off valves, or check valves.

The first bypass valve 223 and the second bypass valve 243 are electric expansion valves. Forms of the first bypass valve 223 and the second bypass valve 243 are, however, not limited thereto. For example, the first bypass valve 223 and the second bypass valve 243 may be electric on-off valves or check valves.

(4-4)

In the first refrigerant circuit 201, the second refrigerant circuit 202, and the third refrigerant circuit 203 of the air conditioning apparatus 200, R32 having high stability is charged as the first refrigerant, the second refrigerant, and the third refrigerant, respectively. However, refrigerant other than R32 may be charged in the refrigerant cycle system presented in the present disclosure. For example, it is preferable that the first refrigerant be R32 and that the second refrigerant and the third refrigerant be carbon dioxide.

Each of the first refrigerant, the second refrigerant, and the third refrigerant charged in the refrigerant cycle system is preferably any one of HFC refrigerant, HFO refrigerant, and a natural refrigerant. Alternatively, each of the first refrigerant and the second refrigerant is preferably a mixture refrigerant that contains any two or more of HFC refrigerant, HFO refrigerant, natural refrigerant, and $CF_3I$. Specifically, the HFC refrigerant is R32, R125, R134a, R143a, R245fa, or the like. The HFO refrigerant is R1234yf, R1234zd, R1123, R1132(E), or the like. The natural refrigerant is R744, R717, R290, R600a, R1270, or the like.

(4-5)

The refrigerant cycle system presented in the present disclosure has been described by using the air conditioning apparatus 200 as a specific example of the refrigerant cycle system. The form of the refrigerant cycle system is, however, not limited thereto. For example, the refrigerant cycle system may be a heat-pump hot water supply apparatus, or the like.

(5) Features (5-1)

The air conditioning apparatus 200 as the refrigerant cycle system presented in the present disclosure includes the first refrigerant circuit 201, the second refrigerant circuit 202, the third refrigerant circuit 203, the first main heat exchanging unit 221a, the second main heat exchanging unit 241a, the first flow-rate regulating valve 222, and the second flow-rate regulating valve 242. The first refrigerant circuit 201 is a vapor compression refrigeration cycle. The second refrigerant circuit 202 is a vapor compression refrigeration cycle. The third refrigerant circuit 203 is a vapor compression refrigeration cycle. The first main heat exchanging unit 221a exchanges heat between the first refrigerant and the second refrigerant. The first refrigerant is refrigerant that flows in the first refrigerant circuit 201. The second refrigerant is refrigerant that flows in the second refrigerant circuit 202. The second main heat exchanging unit 241a exchanges heat between the first refrigerant and the third refrigerant. The third refrigerant is refrigerant that flows in the third refrigerant circuit 203. The first flow-rate regulating valve 222 regulates the amount of the first refrigerant that enters the first main heat exchanging unit 221a in the first refrigerant circuit 201. The second flow-rate regulating valve 242 regulates the amount of the first refrigerant that enters the second main heat exchanging unit 241a in the first refrigerant circuit 201. The first main heat exchanging unit 221a and the second main heat exchanging unit 241a are connected in parallel in the first refrigerant circuit 201.

A dual refrigeration cycle to which a vapor compression refrigeration cycle is connected via a cascade heat exchanger is known in the art. It is preferable in the dual refrigeration cycle that a large number of usage-side units be connectable to one heat source unit, for example, when an air conditioner is constructed in large-scale commercial facility or a construction, such as a building. Consequently, it is possible to reduce a space and costs required for the installation of the air conditioner.

In the air conditioning apparatus 200 presented in the present embodiment, with respect to the first refrigerant circuit 201 that is a vapor compression refrigeration cycle, the second refrigerant circuit 202 including the first main heat exchanging unit 221a and the third refrigerant circuit 203 including the second main heat exchanging unit 241a are connected in parallel. Consequently, it is possible to connect a larger number of usage units with respect to one heat source unit.

(5-2)

The air conditioning apparatus 200 further includes the control unit 260. The control unit 260 regulates the opening degrees of the first flow-rate regulating valve 222 and the second flow-rate regulating valve 242. When the first main heat exchanging unit 221a of the first refrigerant circuit 201 serves as an evaporator, the control unit 260 regulates the opening degree of the first flow-rate regulating valve 222 to cause the first refrigerant that exits the first main heat exchanging unit 221a to be in a superheating state. When the second main heat exchanging unit 241a of the first refrigerant circuit 201 serves as an evaporator, the control unit 260 regulates the opening degree of the second flow-rate regulating valve 242 to cause the first refrigerant that exits a second main heat exchanging unit 242a to be in a superheating state.

The control unit 260 is capable of regulating the opening degrees of the first flow-rate regulating valve 222 and the second flow-rate regulating valve 242. Consequently, the control unit 260 is capable of controlling the degree of superheating of the first refrigerant that exits the first main heat exchanging unit 221a or the second main heat exchanging unit 242a and capable of driving the air conditioning apparatus 200 efficiently.

(5-3)

The air conditioning apparatus 200 further includes the first sub heat exchanging unit 221b. The first sub heat exchanging unit 221b exchanges heat in the first refrigerant circuit 201 between the first refrigerant that has not entered the first main heat exchanging unit 221a yet and the first refrigerant that has exited the first main heat exchanging unit 221a.

The first refrigerant circuit 201 of the air conditioning apparatus 200 further includes the first bypass circuit 225. In the first refrigerant circuit 201, when the first main heat exchanging unit 221a serves as a condenser, the first refrigerant that has exited the first main heat exchanging unit 221a bypasses the first sub heat exchanging unit 221b via the first bypass circuit 225. The first refrigerant that has bypassed the first sub heat exchanging unit 221b is sucked by the compressor 211 included in the first refrigerant circuit 201.

The first main heat exchanging unit 221a of the air conditioning apparatus 200 has heat exchanging capacity larger than that of the first sub heat exchanging unit 221b.

Due to the first sub heat exchanging unit 221b included in the air conditioning apparatus 200, it is possible to reduce a decrease in the heat exchanging capacity of the first main heat exchanging unit 221a caused by control of the degree of superheating of the first refrigerant. In addition, the first bypass circuit 225 included in the air conditioning apparatus 200 enables the first refrigerant to bypass the first sub heat exchanging unit 221b when the first refrigerant circuit 201 performs heating operation. The first main heat exchanging unit 221a is preferably a high-performance heat exchanger having large heat exchanging capacity. The first sub heat exchanging unit 221b is a heat exchanger capable of giving a degree of superheating to the first refrigerant without impairing the heat exchanging capacity of the first main heat exchanging unit 221a.

(5-4)

The air conditioning apparatus 200 further includes the second sub heat exchanging unit 241b. The second sub heat exchanging unit 241b exchanges heat in the second refrigerant circuit 202 between the first refrigerant that has not entered the second main heat exchanging unit 241a yet and the first refrigerant that has exited the second main heat exchanging unit 241a.

In the air conditioning apparatus 200, the first refrigerant circuit 201 further includes the second bypass circuit 245. In the first refrigerant circuit 201, when the second main heat exchanging unit 241a serves as a condenser, the first refrigerant that has exited the second main heat exchanging unit 241a bypasses the second sub heat exchanging unit 241b via the second bypass circuit 245. The first refrigerant that has bypassed the second sub heat exchanging unit 241b is sucked by the compressor 211 included in the first refrigerant circuit 201.

The second main heat exchanging unit 241a of the air conditioning apparatus 200 has heat exchanging capacity larger than that of the second sub heat exchanging unit 241b.

Consequently, it is also possible in the third refrigerant circuit 203 to obtain the same effects as those in the second refrigerant circuit 202.

(5-5)

In the first refrigerant circuit 201, the second refrigerant circuit 202, and the third refrigerant circuit 203 of the air conditioning apparatus 200, R32 having high stability is charged as the first refrigerant, the second refrigerant, and the third refrigerant, respectively. However, refrigerant other than R32 may be charged in the refrigerant cycle system presented in the present disclosure. For example, it is preferable that the first refrigerant be R32 and that the second refrigerant and the third refrigerant be carbon dioxide.

Each of the first refrigerant, the second refrigerant, and the third refrigerant charged in the refrigerant cycle system is preferably any one of HFC refrigerant, HFO refrigerant, and natural refrigerant. Alternatively, each of the first refrigerant and the second refrigerant is preferably a mixture refrigerant that contains any two or more of HFC refrigerant, HFO refrigerant, natural refrigerant, and $CF_3I$.

For example, the aforementioned refrigerants can be employed as refrigerant charged in the air conditioning apparatus 200 according to the present embodiment.

An embodiment of the present disclosure has been described above; however, it should be understood that various changes in the forms and details are possible without departing from the gist and the scope of the present disclosure described in the claims.

REFERENCE SIGNS LIST 1, 201 first refrigerant circuit
2, 202 second refrigerant circuit
3, 203 third refrigerant circuit
13, 25, 213, 225 switching mechanism
21, 221 first cascade heat exchanger
21a, 221a first main cascade heat exchanging unit
21b, 221b first sub cascade heat exchanging unit
22, 222 first flow-rate regulating valve
41, 241 second cascade heat exchanger
41a, 241a second main cascade heat exchanging unit
41b, 241b second sub cascade heat exchanging unit
60, 260 control unit
100, 200 refrigerant cycle system
211 compressor
225 first bypass circuit
245 second bypass circuit

CITATION LIST

Patent Literature

PTL 1: Japanese Unexamined Patent Application Publication No. 2000-193339

The invention claimed is:

1. A refrigerant cycle system comprising:
a first refrigerant circuit that is a vapor compression refrigeration cycle;
a second refrigerant circuit that is a vapor compression refrigeration cycle;
a first cascade heat exchanger that exchanges heat between a first refrigerant that flows in the first refrigerant circuit and a second refrigerant that flows in the second refrigerant circuit,
a first flow-rate regulating valve that regulates an amount of the first refrigerant that flows in the first cascade heat exchanger in the first refrigerant circuit, and
a controller that regulates an opening degree of the first flow-rate regulating valve,
wherein at least either one of the first refrigerant circuit and the second refrigerant circuit includes a switching valve that switches a flow path of a refrigerant of a circuit,
the first cascade heat exchanger includes a first main heat exchanging unit and a first sub heat exchanging unit through which the first refrigerant that has passed through the first main heat exchanging unit passes,
when the first cascade heat exchanger of the first refrigerant circuit serves as an evaporator, the controller regulates the opening degree of the first flow-rate regulating valve to cause the first refrigerant that exits the first sub heat exchanging unit to be in a superheating state, and
the first main heat exchanging unit is a plate heat exchanger or a heat exchanger that includes a plurality of stacked flat pipes, wherein
the first refrigerant circuit further includes a compressor and a heat-source-side heat exchanger,
the second refrigerant circuit further includes a compressor, a usage-side heat exchanger and a second flow-rate regulating valve, when the first cascade heat exchanger of the first refrigerant circuit serves as an evaporator, in the first refrigerant circuit, the first refrigerant flows through the compressor, the heat-source-side heat exchanger, the first flow-rate regulating valve, the first main heat exchanging unit, and the first sub heat exchanging unit in this order, and when the first cascade heat exchanger of the first refrigerant circuit serves as an evaporator, in the second refrigerant circuit, the second refrigerant flows through the compressor, the first sub heat exchanging unit, the first main heat exchanging unit, a second flow-rate regulating valve and the usage-side heat exchanger in this order.

2. The refrigerant cycle system according to claim 1, wherein
the first sub heat exchanging unit is a double pipe or a heat exchanging unit that has a structure in contact with a pipe.

3. The refrigerant cycle system according to claim 2, further comprising:
a third refrigerant circuit that is a vapor compression refrigeration cycle; and
a second cascade heat exchanger that exchanges heat between the first refrigerant that flows in the first refrigerant circuit and a third refrigerant that flows in the third refrigerant circuit,
wherein the second cascade heat exchanger includes a second main heat exchanging unit and a second sub heat exchanging unit for causing a refrigerant that has passed through the second main heat exchanging unit to be in a superheating state, and
the first cascade heat exchanger and the second cascade heat exchanger are connected in parallel in the first refrigerant circuit.

4. The refrigerant cycle system according to claim 2, wherein the first main heat exchanging unit has heat exchanging capacity larger than heat exchanging capacity of the first sub heat exchanging unit.

5. The refrigerant cycle system according to claim 1, further comprising:
a third refrigerant circuit that is a vapor compression refrigeration cycle; and
a second cascade heat exchanger that exchanges heat between the first refrigerant that flows in the first refrigerant circuit and a third refrigerant that flows in the third refrigerant circuit,
wherein the second cascade heat exchanger includes a second main heat exchanging unit and a second sub heat exchanging unit for causing a refrigerant that has passed through the second main heat exchanging unit to be in a superheating state, and
the first cascade heat exchanger and the second cascade heat exchanger are connected in parallel in the first refrigerant circuit.

6. The refrigerant cycle system according to claim 1, wherein the first main heat exchanging unit has heat exchanging capacity larger than heat exchanging capacity of the first sub heat exchanging unit.

7. The refrigerant cycle system according to claim 1, wherein each of the first refrigerant and the second refrigerant is any one of HFC refrigerant, HFO refrigerant, and natural refrigerant or a mixture refrigerant that contains any two or more of HFC refrigerant, HFO refrigerant, natural refrigerant, and $CF_3I$.

8. The refrigerant cycle system according to claim 1, wherein each of the first refrigerant and the second refrigerant is R32.

9. The refrigerant cycle system according to claim 1, wherein the first refrigerant is R32, and
the second refrigerant is carbon dioxide.

10. The refrigerant cycle system according to claim 1, wherein
the first sub heat exchanging unit is a double pipe or a heat exchanging unit that has a structure in contact with a pipe.

11. The refrigerant cycle system according to claim 1, further comprising:
a third refrigerant circuit that is a vapor compression refrigeration cycle; and
a second cascade heat exchanger that exchanges heat between the first refrigerant that flows in the first refrigerant circuit and a third refrigerant that flows in the third refrigerant circuit,
wherein the second cascade heat exchanger includes a second main heat exchanging unit and a second sub heat exchanging unit for causing a refrigerant that has passed through the second main heat exchanging unit to be in a superheating state, and
the first cascade heat exchanger and the second cascade heat exchanger are connected in parallel in the first refrigerant circuit.

12. A refrigerant cycle system comprising:
a first refrigerant circuit that is a vapor compression refrigeration cycle;
a second refrigerant circuit that is a vapor compression refrigeration cycle;
a first main heat exchanging unit that exchanges heat between a first refrigerant that flows in the first refrigerant circuit and a second refrigerant that flows in the second refrigerant circuit,
a first sub heat exchanging unit through which the first refrigerant that has passed through the first main heat exchanging unit passes,
a first flow-rate regulating valve that regulates an amount of the first refrigerant that flows in the first main heat exchanging unit in the first refrigerant circuit, and
a controller that regulates an opening degree of the first flow-rate regulating valve,
wherein at least either one of the first refrigerant circuit and the second refrigerant circuit includes a switching valve that switches a flow path of a refrigerant of a circuit,
when the first main heat exchanging unit of the first refrigerant circuit serves as an evaporator, the controller regulates the opening degree of the first flow-rate regulating valve to cause the first refrigerant that exits the first sub heat exchanging unit to be in a superheating state,
the first main heat exchanging unit is a plate heat exchanger or a heat exchanger that includes a plurality of stacked flat pipes, and
the first sub heat exchanging unit exchanges heat in the first refrigerant circuit between the first refrigerant that has not entered the first main heat exchanging unit yet and the first refrigerant that has exited the first main heat exchanging unit.

13. The refrigerant cycle system according to claim 12, wherein the first refrigerant circuit further includes a first bypass circuit, and
when the first main heat exchanging unit serves as a condenser in the first refrigerant circuit, the first refrigerant that has exited the first main heat exchanging unit bypasses the first sub heat exchanging unit via the first bypass circuit and is sucked by a compressor included in the first refrigerant circuit.

14. The refrigerant cycle system according to claim 13, further comprising:
a third refrigerant circuit that is a vapor compression refrigeration cycle;
a second main heat exchanging unit that exchanges heat between the first refrigerant and a third refrigerant that is a refrigerant that flows in the third refrigerant circuit, and
a second sub heat exchanging unit through which the first refrigerant that has passed through the second main heat exchanging unit passes.

15. The refrigerant cycle system according to claim 12, further comprising:
a third refrigerant circuit that is a vapor compression refrigeration cycle;
a second main heat exchanging unit that exchanges heat between the first refrigerant and a third refrigerant that is a refrigerant that flows in the third refrigerant circuit, and
a second sub heat exchanging unit through which the first refrigerant that has passed through the second main heat exchanging unit passes.

16. The refrigerant cycle system according to claim 15, wherein the first refrigerant circuit further includes a second bypass circuit, and
when the second main heat exchanging unit serves as a condenser in the first refrigerant circuit, the second refrigerant that has exited the second main heat exchanging unit bypasses the second sub heat exchanging unit via the second bypass circuit and is sucked by a compressor included in the first refrigerant circuit.

17. The refrigerant cycle system according to claim 16, wherein the second main heat exchanging unit has heat exchanging capacity larger than heat exchanging capacity of the second sub heat exchanging unit.

18. The refrigerant cycle system according to claim 15, wherein the second main heat exchanging unit has heat exchanging capacity larger than heat exchanging capacity of the second sub heat exchanging unit.

* * * * *